United States Patent
Striepling et al.

(10) Patent No.: US 7,884,063 B2
(45) Date of Patent: Feb. 8, 2011

(54) PHASE INVERSION TEMPERATURE EMUSIONS FOR TEXTILE SCENTING

(75) Inventors: Gert-Lothar Striepling, Duesseldorf (DE); Andreas Bauer, Kaarst (DE); Matthias Hloucha, Cologne (DE); Thomas Gerke, Duesseldorf (DE); Gerard Veldman, Roermond (NL)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 12/613,028

(22) Filed: Nov. 5, 2009

(65) Prior Publication Data
US 2010/0047198 A1 Feb. 25, 2010

Related U.S. Application Data

(63) Continuation of application No. PCT/EP2008/053253, filed on Mar. 19, 2008.

(30) Foreign Application Priority Data

May 7, 2007 (DE) ........................ 10 2007 021 795

(51) Int. Cl.
*C11D 3/50* (2006.01)
(52) U.S. Cl. ..................................................... 510/417
(58) Field of Classification Search ................. 510/417
See application file for complete search history.

(56) References Cited

U.S. PATENT DOCUMENTS

| | | | | |
|---|---|---|---|---|
| 4,749,516 A | * | 6/1988 | Brusky | 510/284 |
| 5,047,168 A | * | 9/1991 | Broze et al. | 510/304 |
| 5,876,702 A | | 3/1999 | Gers-Barlag et al. | |
| 6,022,833 A | | 2/2000 | Mueller et al. | |
| 6,147,047 A | * | 11/2000 | Robbins et al. | 510/417 |
| 6,165,946 A | | 12/2000 | Mueller et al. | |
| 2008/0153929 A1 | * | 6/2008 | Miyahara et al. | 516/55 |

FOREIGN PATENT DOCUMENTS

| | | |
|---|---|---|
| AU | 726703 B2 | 5/1998 |
| CA | 2270716 | 5/1998 |
| DE | 195 48 016 A1 | 6/1997 |
| DE | 196 43 840 A1 | 5/1998 |
| DE | 196 30 176 C2 | 11/2000 |
| EP | 0 676 497 A2 | 10/1995 |

OTHER PUBLICATIONS

Manfred Kahlweit et al., "Phasenverhalten ternärn rer Systeme desTyps $H_2O$—Öl—nichtionisches Amphiphil (Mikroemulsionen)," *Angew. Chem.*, vol. 97, 1985, pp. 655-669.
T. Förster et al., "Influence of Microemulsion Phases on the Preparation of Fine-Disperse Emulsions,"*Advances in Colloid and Interface Science*, vol. 58, 1995, pp. 119-149.
Arnold J. Gordon et al., "The Chemist's Companion," John Wiley & Sons Publishers, 1972, pp. 30-36.
David T. Stanton et al., "Computer-Assisted Prediction of Normal Boiling Points of Pyrans and Pyrroles," *J. Chem. Inf. Comput. Sci.*, vol. 32, 1992, pp. 306-316.
David T. Stanton et al., "Computer-Assisted Prediction of Normal Boiling Points of Furans, Tetrahydrofurans, and Thiophenes," *J. Chem. Inf. Comput. Sci.*, vol. 31, 1991, pp. 301-310.
Ramiah Murugan et al., "Predicting physical properties from molecular structure," *Chemtech*, Jun. 1994, pp. 17-23.
International Search Report of PCT/EP2008/053253, dated Jul. 7, 2008.

* cited by examiner

*Primary Examiner*—John R Hardee
(74) *Attorney, Agent, or Firm*—RatnerPrestia

(57) ABSTRACT

A perfume-containing PIT emulsion which is suited to contribute to an excellent and long-lasting scenting of textiles during the use of a dryer. The PIT emulsion is simple for the user to handle and allows the user to better control the user's individual scent experience during the handling of textiles. The PIT emulsions can also be used for aroma therapy purposes and for the scenting of rooms. In addition, a kit made of detergents and the perfume-containing PIT emulsion, which enables the user to obtain optimal laundry scenting results.

16 Claims, No Drawings

PHASE INVERSION TEMPERATURE EMUSIONS FOR TEXTILE SCENTING

CROSS-REFERENCE TO RELATED APPLICATIONS

This application is a continuation under 35 U.S.C. §§120 and 365(c) of International Application PCT/EP2008/053253, filed on Mar. 19, 2008. This application also claims priority under 35 U.S.C. §119 of DE 10 2007 021 795.3, filed on May 7, 2007. The disclosures of PCT/EP2008/053253 and DE 10 2007 021 795.3 are incorporated herein by reference in their entirety.

BACKGROUND OF THE INVENTION

The present invention relates to a perfume-containing PIT emulsion, which has a phase inversion temperature in the range from 35-80° C. It further relates to a container with spray valve which contains such a PIT emulsion. It further relates to an automatic laundry dryer, which comprises an installation for spraying such PIT emulsions during the drying process. It further relates to a method for laundry scenting in a textile drying method using the PIT emulsion. It further relates to a method for room scenting using the PIT emulsion. It further relates to a kit consisting of textile washing agent and a container with spray valve, which contains the above-stated PIT emulsion.

When laundering textiles, the consumer generally not only pursues the objective of removing soiling from the laundry for hygienic reasons but also wishes to make the textiles smell nice after laundering. For this reason and to cover up the intrinsic odor of the textile washing agent, most commercially available textile washing agents contain odoriferous substances. When using conventional washing agents, however, often only a relatively slight fragrance remains on the laundry after washing, in particular when a laundry dryer is used. One possible way of achieving stronger laundry scenting is to use perfumed rinse conditioners. The use thereof leads to improved textile scenting. A disadvantage of the use of rinse conditioners, however, remains the resultant, reduced water absorption capacity of the laundry treated with rinse conditioners.

DESCRIPTION OF THE INVENTION

The object of the present invention was accordingly to provide an agent which allows the consumer to achieve improved textile scenting in the context of conventional machine textile treatment.

This object is achieved by the subject matter of the invention, namely a perfume-containing PIT emulsion, which has a phase inversion temperature in the range from 35-80° C., advantageously 40-75° C., preferably 45-70° C., in particular in the range from 50-65° C. Such a PIT emulsion may be used by the consumer for laundry scenting in conventional commercial automatic (preferably electric) textile dryers, preferably by spraying, and in this way permits excellent and extremely long-lasting textile scenting. Both the durability and intensity of the resultant odor impression and also its attractiveness are superb. Since textiles which are dried in a textile dryer do not require any rinse conditioner treatment as a result of the vigorous, fiber-loosening movements in the dryer, the present invention allows at least the same advantages to be achieved by provision of the PIT emulsion according to the invention as may also be achieved when textile rinse conditioners are used but without having to tolerate the disadvantages thereof, such as for example the reduced water absorption capacity of the textiles. In terms of the achievable odor impression (attractiveness/intensity/durability), the performance of textile rinse conditioners is even exceeded.

The PIT emulsions (PIT=phase inversion temperature) according to the invention, i.e. O/W emulsions, are particularly finely dispersed and are distinguished by long term stability. Methods for producing finely dispersed, O/W emulsions with long-lasting stability by means of the phase inversion technique are known per se. The production of a PIT emulsion according to the invention functions for example as follows. A W/O emulsion is produced at a temperature which lies at or above the phase inversion temperature of the system, i.e. the temperature at which equilibrium is achieved between the hydrophilic and lipophilic characteristics of the emulsifier or emulsifiers used; at a higher temperature (>PIT) the emulsion is thus of the water-in-oil type and on cooling to the phase inversion temperature the emulsion inverts and becomes an emulsion of the oil-in-water type, this transformation proceeding via a coemulsion state. Using this technique, particularly finely dispersed O/W emulsions are obtained, in which the average size of the droplets, which form the fat phase (oil bodies), lies in very narrow ranges, namely preferably in the range from 50 to 1000 nm, advantageously less than 400 nm, in particular in the range from 100-300 nm. This corresponds to a preferred embodiment of the invention. Such PIT emulsions which may be preferred according to the invention are for example those having an average particle diameter of approx. 200 nm. This corresponds to a preferred embodiment of the invention.

A PIT emulsion according to the invention may also be produced by subsequently heating an emulsion which was initially produced conventionally to a temperature which lies within or above the phase inversion temperature range and then cooling it.

It is also possible to dilute an anhydrous concentrate or a concentrate with low water content at the phase inversion temperature with hot or cold water (hot-hot or hot-cold method), so as to arrive at a PIT emulsion according to the invention.

The phase inversion temperature of the system, which according to the invention lies in the range from 35-80° C., may conventionally be determined in that a sample of the conventionally produced emulsion is heated and, using a conductivity meter, the temperature is determined at which conductivity drops sharply. The drop in specific conductivity of the initially present O/W emulsion here generally proceeds sharply over a temperature range conventionally of several ° C., e.g. of 2 to 8° C., for example from originally greater than 1 mS/cm to values of below 0.1 mS/cm. The temperature range may extend for example also from 5 to 15° C. The crucial factor is that conductivity reduces sharply within a temperature range. This range then corresponds to the phase inversion temperature range.

Further details relating to PIT emulsions may be inferred from a plurality of documents, as representative of which are mentioned the publications in Angew. Chem. 97, 655-669 (1985) and Adv. Colloid Interface Sci. 58, 119-149 (1995).

In a preferred embodiment, a PIT emulsion according to the invention contains
a) nonionic surfactants, advantageously in quantities of 0.1-25 wt. %, preferably of 1-15 wt. %, in particular of 2-10 wt. %,
b) coemulsifiers, advantageously in quantities of 0-10 wt. %, preferably of 0.1-5 wt. %, in particular of 1-4 wt. %,
c) perfume oil, preferably in quantities of >1 wt. %, advantageously of 2-30 wt. %, in particular of 5-20 wt. %,
d) water, wt. % relative to the total PIT emulsion.

The nonionic surfactants serve as emulsifiers. In a preferred embodiment, a PIT emulsion according to the invention contains as nonionic surfactants alkoxylated fatty alcohols, alkyl polyglucosides and/or fatty acid partial glycerides.

The quantity of water is conventionally >30 wt. %, preferably >40 wt. %, advantageously >50 wt. % and in particular >60 wt. %. Water quantities of >70 wt. % are also possible, wt. % in each case relative to the total PIT emulsion.

The oil body (fat phase) of the PIT emulsion according to the invention may also contain further oil components in addition to the perfume oil. Polar oil components with one or more ester groups per molecule are particularly suitable, or indeed also mixtures of such polar oil components with smaller quantities of nonpolar hydrocarbons.

Particularly suitable polar oil components are mono- and diesters of the general formula (I), (II) and (III)

$$R^1\text{---}COOR^2 \qquad (I)$$

$$R^2\text{---}OOC\text{---}R^3\text{---}COOR^2 \qquad (II)$$

$$R^1\text{---}COO\text{---}R^3\text{---}OOC\text{---}R^1 \qquad (III)$$

in which $R^1$ means an alkyl group with 8 to 22 C atoms and $R^2$ an alkyl group with 3 to 22 C atoms and $R^3$ alkylene groups with 2 to 16 C atoms, with the proviso that the total number of C atoms in compounds (I) to (III) amounts to at least 11.

The most significant mono- and diesters of this type are products which are liquid at room temperature (20° C.). Suitable monoesters (I) are for example the isopropyl esters of fatty acids with 12 to 22 C atoms, such as for example isopropyl myristate, isopropyl palmitate, isopropyl stearate, isopropyl oleate. Other suitable monoesters are for example n-butyl stearate, n-hexyl laurate, n-decyl oleate, isooctyl stearate, isononyl palmitate, isononyl isononanoate, 2-ethylhexyl palmitate, 2-ethylhexyl laurate, 2-hexyldecyl stearate, 2-octyldodecyl palmitate, oleyl oleate, oleyl erucate, erucyl oleate and esters which may be obtained from technical aliphatic alcohol mixtures and technical aliphatic carboxylic acids, for example esters from saturated and unsaturated fatty alcohols with 12 to 22 C atoms and saturated and unsaturated fatty acids with 12 to 22 C atoms, as are obtainable from animal and plant fats. Naturally occurring monoester or wax ester mixtures, as are present for example in jojoba oil or in sperm oil, are also suitable.

Suitable dicarboxylic acid esters (II) are for example di-n-butyl adipate, di-n-butyl sebacate, di-(2-ethylhexyl) adipate, di-(2-hexyldecyl) succinate and diisotridecyl acelate. Suitable diol esters (III) are for example ethylene glycol dioleate, ethylene glycol diisotridecanoate, propylene glycol di-(2-ethylhexanoate), propylene glycol diisostearate, propylene glycol dipelargonate, butanediol diisostearate and neopentyl glycol dicaprylate.

Also highly suitably as the oil bodies are esters of tri- and polyhydric alcohols, in particular plant triglycerides, for example olive oil, almond oil, peanut oil, sunflower oil or also the esters of pentaerythritol with for example pelargonic acid or oleic acid.

Natural plant oils may be used as fatty acid triglycerides, for example olive oil, sunflower oil, soy oil, peanut oil, rapeseed oil, almond oil, palm oil, or indeed the liquid fractions of coconut oil or of palm kernel oil, and animal oils, such as for example neatsfoot oil, the liquid fractions of beef fat or also synthetic triglycerides, as are obtained by the esterification of glycerol with fatty acids with 8-22 C atoms, for example triglycerides of caprylic-capric acid mixtures, triglycerides of technical oleic acid or of palmitic-oleic acid mixtures.

Mono- and diesters and triglycerides which are preferably suitable as oil components are those which are liquid at a normal temperature of 20° C., but higher melting point fats and esters which correspond to the stated formulae may also be used in such quantities that the mixture of the oil components remains liquid at normal temperature.

The oil component may also contain hydrocarbon oils, preferably in subordinate quantities of up to at most 25 wt. %, relative to the oil component. Suitable hydrocarbons are above all paraffin oils and synthetically produced hydrocarbons, for example liquid polyolefins or defined hydrocarbons, for example alkylcyclohexanes, such as for example 1,3-diisooctylcyclohexane. The oil component may also contain silicone oils, preferably linear polydimethylsiloxanes and/or poly(methylphenylsiloxanes). Preferred silicone oils have relative molar masses in the range from 1000-150000. If silicone oils are present, a preferred embodiment of the invention is provided.

Suitable nonionic surfactants are in particular those substances which comprise a lipophilic, preferably linear alkyl or acyl group and a hydrophilic group formed from low molecular weight glycol, glucose and polyol ethers.

Suitable nonionic surfactants are above all addition products of ethylene oxide onto fatty alcohols with preferably 16 to 22 C atoms. Such products are conventionally commercial. The technical products are conventionally mixtures of homologous polyglycol ethers of the starting fatty alcohols, the average degree of ethoxylation of which corresponds to the attached molar quantity of ethylene oxide. Addition products of ethylene oxide onto partial esters prepared from a polyol with 3 to 6 C atoms and fatty acids with 14 to 22 C atoms may also be used. Such products are produced, for example, by ethoxylation of fatty acid partial glycerides or of mono- and di-fatty acid esters of sorbitan, for example of sorbitan monostearate or sorbitan sesquioleate. Nonionic surfactants which are particularly suitable according to the invention exhibit an HLB value of 10 to 18. If such nonionic surfactants are present, a preferred embodiment of the invention is provided. The HLB value (hydrophilic-lipophilic balance) is taken to mean a value which may be calculated according to $$HLB = \frac{100 - L}{5}$$

in which L is the percentage proportion by weight of lipophilic groups, i.e. the fatty alkyl or fatty acyl groups, in the ethylene oxide addition products.

Preferably suitable fatty alcohol polyglycol ethers are those of the general formula (IV)

$$R^4\text{---}(O\text{---}CH_2\text{---}CH_2)_n\text{---}OH \qquad (IV)$$

in which $R^4$ means a saturated or unsaturated, straight-chain or branched hydrocarbon residue with 8 to 22 C atoms, preferably 12 to 22 C atoms, and n means an integer from 10 to 50, preferably from 10 to 30, and addition products of 4 to 20 mol of ethylene oxide onto one or more fatty acid partial glycerides.

Fatty acid partial glycerides of saturated or unsaturated fatty acids with 10 to 20 C atoms should here be taken to mean technical mixtures of fatty acid mono-, di- and triglycerides which are obtained by esterification of 1 mol of glycerol with 1 to 2 mol of a ($C_{10\text{-}20}$) fatty acid or by transesterification of 1 mol of a ($C_{10\text{-}20}$) fatty acid triglyceride, for example from beef fat, pig fat, palm oil, sunflower oil or soy oil with 0.5 to 2 mol of glycerol. Two types of partial glycerides are conventionally commercial. Type I partial glycerides contain 35 to 60% monoglycerides, 35 to 50% diglycerides and 1 to 20% triglycerides. Type II partial glycerides are produced by molecular distillation from those of type I and contain 90 to 96% monoglycerides, 1 to 5% diglycerides and less than 1% triglycerides. The fatty acid partial glycerides usable according to the invention should preferably contain 35 to 96% monoglycerides, 1 to 50% diglycerides and 0.1 to 20% triglycerides.

Preferably suitable are addition products of 8 to 12 mol of ethylene oxide onto saturated fatty alcohols with 16 to 22 C atoms or with 18 to 22 C atoms.

The PIT emulsions according to the invention may preferably contain alkyl polyglucosides.

These may be obtained in accordance with the relevant methods of preparative organic chemistry. Comprehensive literature is available in this connection.

The alkyl polyglucosides may be derived from aldoses or ketoses with 5 or 6 carbon atoms, preferably from glucose.

Preferably usable alkyl polyglucosides, RO-[G]$_p$, will now be described in greater detail: in the formula RO-[G]$_p$, G denotes a glycose unit with 5 or 6 C atoms, preferably glucose. R may be an alkyl residue. The alkyl residue R may be derived from primary saturated alcohols. Typical examples are 1-butanol, caproic, oenanthic, caprylic, pelargonic, capric alcohol, 1-undecanol, lauryl alcohol, 1-tridecanol, myristyl alcohol, 1-pentadecanol, cetyl alcohol, palmityl alcohol, 1-heptadecanol, stearyl alcohol, isostearyl alcohol, 1-nonadecanol, arachidyl alcohol, 1-heneicosanol, and behenyl alcohol and the technical mixtures thereof. R may be an alkylene residue. The alkenyl residue R may also be derived from primary unsaturated alcohols. Typical examples of unsaturated alcohols are 1-undecenol, oleyl alcohol, elaidyl alcohol, ricinol alcohol, linoleyl alcohol, linolenyl alcohol, gadoleyl alcohol, arachidonic alcohol, erucic alcohol, brassidyl alcohol, palmoleyl alcohol, petroselinyl alcohol, arachyl alcohol, and the technical mixtures thereof. Alkyl or alkenyl residues R which are derived from primary alcohols with 6 to 16 carbon atoms are preferred. Particularly suitable alkyl polyglucosides are those of a chain length of C8-C10, which arise for example as a forerun in the distillative separation of technical C8-C18 coconut fatty alcohol and which may be contaminated with a fraction of less than 6 wt. % of C12 alcohol together with alkyl polyglucosides based on technical C9/11 oxo alcohols. The alkyl or alkenyl residue R may furthermore also be derived from primary alcohols with 12 to 14 carbon atoms. The index value p in the general formula RO-[G]$_p$ indicates the degree of oligomerization, i.e. the distribution of mono- and oligoglycosides, and denotes a number between 1 and 10. While p must always be integral in a given compound and in this case may primarily assume the values p=1 to 3, the value p for a specific alkyl polyglucoside is a calculated value determined by analysis and is usually a fractional number. Alkyl polyglucosides with an average degree of oligomerization p of 1.1 to 2.0 are preferably used. From an applicational standpoint, preferred alkyl polyglucosides are those whose degree of oligomerization is less than 2.0 and in particular is between 1.2 and 1.7. Preferably used alkyl polyglucosides of the formula RO-[G]$_p$ are those in which p denotes numbers from 1 to 3 and R denotes an alkyl residue with 6 to 16 carbon atoms.

In addition to the nonionic surfactant, a PIT emulsion according to the invention may advantageously also contain coemulsifier. Suitable coemulsifiers are in particular those of the type of fatty alcohols with 16 to 22 C atoms, for example cetyl alcohol, stearyl alcohol, arachidyl alcohol or behenyl alcohol, or mixtures of these alcohols, as are obtained from the technical hydrogenation of plant and animal fatty acids with 16 to 22 C atoms, or the corresponding fatty acid methyl esters. Suitable coemulsifiers are furthermore partial esters prepared from a polyol with 3 to 6 C atoms and fatty acids with 14 to 22 C atoms. Such partial esters are for example the monoglycerides of palmitic and/or stearic acid, the sorbitan mono- and/or diesters of myristic acid, palmitic acid, stearic acid or of mixtures of these fatty acids, the monoesters prepared from trimethylolpropane, erythritol or pentaerythritol and saturated fatty acids with 14 to 22 C atoms. Monoesters are also taken to mean the technical monoesters which are obtained by esterification of 1 mol of polyol with 1 mol of fatty acid and which constitute a mixture of monoesters, diesters and unesterified polyol.

Cetyl alcohol, stearyl alcohol or a glycerol, sorbitan or trimethylolpropane monoester of a fatty acid with 14 to 22 C atoms or mixtures of these substances are, for example, particularly suitable.

A PIT emulsion which is particularly preferred according to the invention is stated by way of example in the Examples section.

Perfume oils are an essential component of the PIT emulsions according to the invention. Perfume oils (odoriferous substances, fragrances) which may be used are individual odoriferous compounds, for example synthetic products of the ester, ether, aldehyde, ketone, alcohol and hydrocarbon type. Preferably, however, mixtures of various odoriferous substances are used which together produce an attractive fragrance note. Such perfume oils may also contain natural odoriferous substance mixtures, as are obtainable from plant sources.

A usable perfume oil may contain individual odoriferous compounds, for example synthetic products of the ester, ether, aldehyde, ketone, alcohol and hydrocarbon type. Odoriferous compounds of the ester type are for example benzyl acetate, phenoxyethyl isobutyrate, p-tert.-butylcyclohexyl acetate, linalyl acetate, dimethylbenzylcarbinyl acetate (DM-BCA), phenylethyl acetate, benzyl acetate, ethylmethylphenyl glycinate, allylcyclohexyl propionate, styrallyl propionate, benzyl salicylate, cyclohexyl salicylate, floramate, melusate and jasmecyclate. Ethers include, for example, benzyl ethyl ether and ambroxan, aldehydes include, for example, linear alkanals with 8-18 C atoms, citral, citronellal, citronellyloxyacetaldehyde, cyclamen aldehyde, lilial and bourgeonal, ketones include, for example, ionones, α-isomethylionone and methyl cedryl ketone, alcohols include anethole, citronellol, eugenol, geraniol, linalool, phenylethyl alcohol and terpineol, the hydrocarbons mainly include terpenes and balsams such as limonene and pinene. Preferably, however, mixtures of various odoriferous substances are used which together produce an attractive fragrance note of the resultant perfume oil.

The perfume oils may, however, also contain natural odoriferous substance mixtures, as are obtainable from plant sources, for example pine, citrus, jasmine, patchouli, rose, or ylang-ylang oil. Likewise suitable are muscatel sage oil, chamomile oil, clove oil, melissa oil, mint oil, cinnamon leaf oil, lime blossom oil, juniper berry oil, vetiver oil, olibanum oil, galbanum oil and labdanum oil and orange-blossom oil, neroli oil, orange peel oil and sandalwood oil. If it is to be perceptible, an odoriferous substance must be volatile, wherein, in addition to the nature of the functional groups and the structure of the chemical compound, an important role is also played by molar mass. Most odoriferous substances accordingly have molar masses of up to approx. 200 Dalton, while molar masses of 300 Dalton and above tend to be the exception. Due to the differing volatility of odoriferous substances, the odor of a perfume composed of two or more odoriferous substances varies over the course of vaporization, it being possible to subdivide odor impressions into "head or top note", "heart or middle note" and "end note or dry-out".

Tenacious odoriferous substances which may advantageously be used for the purposes of the present invention are, for example, essential oils such as angelica root oil, anise oil, arnica blossom oil, basil oil, bay oil, champak flower oil, silver fir oil, silver fir cone oil, elemi oil, eucalyptus oil, fennel oil, spruce oil, galbanum oil, geranium oil, ginger grass oil, guaiacwood oil, gurjun balsam oil, helichrysum oil, ho oil, ginger oil, iris oil, cajeput oil, calamus oil, chamomile oil, camphor oil, canaga oil, cardamom oil, cassia oil, Scotch fir oil, copaiba balsam oil, coriander oil, spearmint oil, caraway oil, cumin oil, lemongrass oil, ambrette oil, myrrh oil, clove oil, neroli oil, niaouli oil, olibanum oil, origanum oil, palmarosa oil, patchouli oil, Peru balsam oil, petitgrain oil, pepper oil, peppermint oil, pimento oil, pine oil, rose oil, rosemary oil, sandalwood oil, celery oil, star anise oil, thuja oil, thyme oil, verbena oil, vetiver oil, juniper berry oil, wormwood oil, wintergreen oil, ylang-ylang oil, hyssop oil, cinnamon oil, cinnamon leaf oil and cypress oil. Higher-boiling or solid odoriferous substances of natural or synthetic origin may, however, also be used advantageously for the purposes of the present invention as tenacious odoriferous substances or odoriferous substance mixtures. These compounds include the compounds stated below and mixtures thereof: ambrettolide, α-amylcinnamaldehyde, anethole, anisaldehyde, anisyl alcohol, anisole, anthranilic acid methyl ester, acetophenone, benzyl acetone, benzaldehyde, benzoic acid ethyl ester, benzophenone, benzyl alcohol, borneol, bornyl acetate, α-bromostyrene, n-decylaldehyde, n-dodecylaldehyde, eugenol, eugenol methyl ether, eucalyptol, farnesol, fenchone, fenchyl acetate, geranyl acetate, geranyl formate, heliotropin, methyl heptine carbonate, heptaldehyde, hydroquinone dimethyl ether, hydroxycinnamaldehyde, hydroxycinnamyl alcohol, indole, irone, isoeugenol, isoeugenol methyl ether, isosafrole, jasmone, camphor, carvacrol, carvone, p-cresol methyl ether, coumarin, p-methoxyacetophenone, methyl N-amyl ketone, methylanthranilic acid methyl ester, p-methylacetophenone, methylchavicol, p-methylquinoline, methyl β-naphthyl ketone, methyl n-nonylacetaldehyde, methyl n-nonyl ketone, muscone, β-naphthol ethyl ether, β-naphthol methyl ether, nerol, nitrobenzene, n-nonylaldehyde, nonyl alcohol, n-octylaldehyde, p-oxyacetophenone, pentadecanolide, β-phenyl ethyl alcohol, phenylacetaldehyde dimethyl acetal, phenylacetic acid, pulegone, safrole, isoamyl salicylate, methyl salicylate, hexyl salicylate, cyclohexyl salicylate, santalol, skatole, terpineol, thymene, thymol, 7-undecalactone, vanillin, veratrumaldehyde, cinnamaldehyde, cinnamyl alcohol, cinnamic acid, ethyl cinnamate, benzyl cinnamate. More highly volatile odoriferous substances, which may advantageously be used for the purposes of the present invention, include in particular lower-boiling odoriferous substances of natural or synthetic origin, which may be used alone or in mixtures. Examples of more highly volatile odoriferous substances are alkyl isothiocyanates (alkyl mustard oils), butanedione, limonene, linalool, linalyl acetate and propionate, menthol, menthone, methyl-n-heptenone, phellandrene, phenylacetaldehyde, terpinyl acetate, citral, citronellal.

Since the agent according to the invention permits highly specific perfuming of the laundry via the machine textile drying operation, the consumer may also be offered highly specific fragrance experiences, for example laundry with an apricot-like odor or laundry with a rose-like odor.

In a preferred embodiment, the PIT emulsion according to the invention may accordingly in particular contain odoriferous substances with (a) an almond-like odor, such as preferably benzaldehyde, pentanal, heptenal, 5-methylfurfural, methylbutanal, furfural and/or acetophenone or (b) an apple-like odor, such as preferably (S)-(+)-ethyl-2-methyl butanoate, diethyl malonate, ethyl butyrate, geranyl butyrate, geranyl isopentanoate, isobutyl acetate, linalyl isopentanoate, (E)-β-damascone, heptyl-2-methyl butyrate, methyl 3-methylbutanoate, 2-hexenalpentylmethyl butyrate, ethylmethyl butyrate and/or methyl 2-methylbutanoate or (c) an apple peel-like odor, such as preferably ethyl hexanoate, hexyl butanoate and/or hexyl hexanoate or (d) an apricot-like odor such as preferably γ-undecalactone or (e) a banana-like odor, such as preferably isobutyl acetate, isoamyl acetate, hexenyl acetate and/or pentyl butanoate or (f) a bitter almond-like odor such as preferably 4-acetyltoluene or (g) a blackcurrant-like odor such as preferably mercaptomethylpentanone and/or methoxymethylbutanethiol or (h) a citrus-like odor such as preferably linalyl pentanoate, heptanal, linalyl isopentanoate, dodecanal, linalyl formate, α-p-dimethylstyrene, p-cymenol, nonanal, β-cubebene, (Z)-limonene oxide, cis-6-ethenyltetrahydro -2,2,6-trimethylpyran-3-ol, cis-pyranoid linalool oxide, dihydrolinalool, 6(10)-dihydromyrcenol, dihydromyrcenol, β-farnesene, (Z)-β-farnesene, (Z)-ocimene, (E)-limonene oxide, dihydroterpinyl acetate, (+)-limonene, (epoxymethylbutyl)-methylfuran and/or p-cymene or (i) a cocoa-like odor such as preferably dimethylpyrazine, butylmethyl butyrate and/or methylbutanal or (j) a coconut-like odor, such as preferably γ-octalactone, γ-nonalactone, methyl laurate, tetradecanol, methyl nonanoate, (3S,3aS,7aR) -3a,4,5,7a-tetrahydro-3,6-dimethylbenzofuran-2(3H)-one, 5-butyldihydro -4-methyl-2 (3H)-furanone, ethyl undecanoate and/or δ-decalactone or (k) a cream-like odor such as preferably diethyl acetal, 3-hydroxy-2-butanone, 2,3-pentadione and/or 4-heptenal or (l) a flower-like odor such as preferably benzyl alcohol, phenylacetic acid, tridecanal, p-anisyl alcohol, hexanol, (E,E)-farnesyl acetone, methyl geranate, trans-crotonaldehyde, tetradecyl aldehyde, methyl anthranilate, linalool oxide, epoxylinalool, phytol, 10-epi-γ-eudesmol, nerol oxide, ethyl dihydrocinnamate, γ-dodecalactone, hexadecanol, 4-mercapto-4-methyl-2-pentanol, (Z)-ocimene, cetyl alcohol, nerolidol, ethyl (E)-cinnamate, elemicin, pinocarveol, α-bisabolol, (2R,4R)-tetrahydro -4-methyl-2-(2-methyl-1-propenyl )-2H-pyran, (E)-isoelemicin, methyl 2-methylpropanoate, trimethylphenylbutenone, 2-methylanisole, β-farnesol, (E)-isoeugenol, nitrophenylethane, ethyl vanillate, 6-methoxyeugenol, linalool, β-ionone, trimethylphenylbutenone, ethyl benzoate, phenylethyl benzoate, isoeugenol and/or acetophenone or (m) a fresh odor such as preferably methyl hexanoate, undecanone, (Z)-limonene oxide, benzyl acetate, ethyl hydroxyhexanoate, isopropyl hexanoate, pentadecanal, β-elemene, α-zingiberene, (E)-limonene oxide, (E)-p-mentha-2,8-dien-1-ol, menthone, piperitone, (E)-3-hexenol and/or carveol or (n) a fruit odor such as preferably ethyl phenylacetate, geranyl valerate, γ-heptalactone, ethyl propionate, diethyl acetal, geranyl butyrate, ethyl heptylate, ethyl octanoate, methyl hexanoate, dimethylheptenal, pentanone, ethyl 3-methylbutanoate, geranyl isovalerate, isobutyl acetate, ethoxypropanol, methyl-2-butenal, methylnonanedione, linalyl acetate, methyl geranate, limonene oxide, hydrocinnamic alcohol, diethyl succinate, ethyl hexanoate, ethylmethylpyrazine, neryl acetate, citronellyl butyrate, hexyl acetate, nonyl acetate, butylmethyl butyrate, pentenal, isopentyldimethylpyrazine, p-menth-1-en-9-ol, hexadecanone, octyl acetate, γ-dodecalactone, epoxy-β-ionone, ethyl octenoate, ethyl isohexanoate, isobornyl propionate, cedrenol, p-menth-1-en-9-yl acetate, cadinadiene, (Z)-3-hexenyl hexanoate, ethyl cyclohexanoate, 4-methylthio-2-butanone, 3,5-octadienone, methylcyclohexane carboxylate, 2-pentylthiophene, α-ocimene, butanediol, ethyl valerate, pentanol, isopiperitone, butyl octanoate, ethyl vanillate, methyl butanoate, 2-methylbutyl acetate, propyl hexanoate, butyl hexanoate, isopropyl butanoate, spathulenol, butanol, δ-dodecalactone, methylquinoxaline, sesquiphellandrene, 2-hexenol, ethyl benzoate, isopropyl benzoate, ethyl lactate and/or citronellyl isobutyrate or (o) a geranium-like odor, such as preferably geraniol, (E,Z)-2,4-nonadienal, octadienone and/or o-xylene or (p) a grape-like odor such as preferably ethyl decanoate and/or hexanone or (q) a grapefruit-like odor such as preferably (+)-5,6-dimethyl-8-isopropenylbicyclo [4.4.0]dec-1-en-3-one and/or p-menthenethiol or (r) a grass-like odor such as preferably 2-ethylpyridine, 2,6-dimethyinaphthalene, hexanal and/or (Z)-3-hexenol or (s) a green note, preferably 2-ethylhexanol, 6-decenal, dimethylheptanal, hexanol, heptanol, methyl-2-butenal, hexyl octanoate, nonanoic acid, undecanone, methyl geranate, isobornyl formate, butanal, octanal, nonanal, epoxy-2-decenal, cis-linalool, pyran oxide, nonanol, alpha, γ-dimethylallyl alcohol, (Z)-2-penten-1-ol, (Z)-3-hexenyl butanoate, isobutylthiazole, (E)-2-nonenal, 2-dodecenal, (Z)-4-decenal, 2-octenal, 2-hepten-1-al, bicyclogermacrene, 2-octenal, α-thujene, (Z)-β-farnesene, (−)-γ-elemene, 2,4-octadienal, fucoserratene, hexenyl acetate, geranyl acetone, valencene, β-eudesmol, 1-hexenol, (E)-2-undecenal, Artemisia ketone, viridiflorol, 2,6-nonadienal, trimethylphenylbutenone, 2,4-nonadienal, butyl isothiocyanate, 2-pentanol, elemol, 2-hexenal, 3-hexenal, (+)-(E)-limonene oxide, cis-isocitral, dimethyloctadienal, bornyl formate, bornyl isovalerate, isobutyraldehyde, 2,4-hexadienal, trimethylphenylbutenone, nonanone, (E)-2-hexenal, (+)-cis-rose oxide, menthone, coumarin, (epoxymethylbutyl)-methylfuran, 2-hexenol, (E)-2-hexenol and/or carvyl acetate or (t) a green tea-like odor, preferably (−)-cubenol or (u) a herb-like odor, preferably octanone, hexyl octanoate, caryophyllene oxide, methylbutenol, safranal, benzyl benzoate, bornyl butyrate, hexyl acetate, β-bisabolol, piperitol, β-selinene, α-cubebene, p-menth-1-en-9-ol, 1,5,9,9-tetramethyl-12-oxabicyclododeca-4,7-diene, T-muurolol, (−)-cubenol, levomenol, ocimene, α-thujene, p-menth-1-en-9-yl acetate, dehydrocarveol, Artemisia alcohol, γ-muurolene, hydroxypentanone, (Z)-ocimene, β-elemene, δ-cadinol, (E)-β-ocimene, (Z)-dihydrocarvone, α-cadinol, calamenene, (Z)-piperitol, lavandulol, β-bourbonene, (Z)-3-hexenyl 2-methylbutanoate, 4-(1-methylethyl)-benzenemethanol, Artemisia ketone, methyl-2-butenol, heptanol, (E)-dihydrocarvone, p-2-menthen-1-ol, α-curcumene, spathulenol, sesquiphellandrene, citronellyl valerate, bornyl isovalerate, 1,5-octadien-3-ol, methyl benzoate, 2,3,4,5-tetrahydroanisole and/or hydroxycalamenene or (v) a honey-like odor, preferably ethyl cinnamate, β-phenethyl acetate, phenylacetic acid, phenylethanal, methyl anthranilate, cinnamic acid, β-damascenone, ethyl (E)-cinnamate, 2-phenylethyl alcohol, citronellyl valerate, phenylethyl benzoate and/or eugenol or (w) a hyacinth-like odor, preferably hotrienol or (x) a jasmine-like odor, preferably methyl jasmonate, methyl dihydroepijasmonate and/or methyl epijasmonate or (y) a lavender-like odor, preferably linalyl valerate and/or linalool or (z) a lemon-like odor, preferably neral, octanal, δ-3-carene, limonene, geranial, 4-mercapto-4-methyl-2-pentanol, citral, 2,3-dehydro-1,8-cineole, and/or α-terpinene or (aa) a lily-like odor, preferably dodecanal or (bb) a magnolia-like odor, preferably geranyl acetone, or (cc) a mandarin-like odor, preferably undecanol or (dd) a melon-like odor, preferably dimethylheptenal, or (ee) a mint-like odor, preferably menthone, ethyl salicylate, p-anisaldehyde, 2,4,5,7a-tetrahydro-3,6-dimethylbenzofuran, epoxy-p-menthene, geranial, (methylbutenyl)-methylfuran, dihydrocarvyl acetate, β-cyclocitral, 1,8-cineole, β-phellandrene, methylpentanone, (+)-limonene, dihydrocarveol, (−)-carvone, (E)-p-mentha-2,8-dien-1-ol, isopulegyl acetate, piperitone, 2,3-dehydro-1,8-cineole, α-terpineol, DL-carvone and/or α-phellandrene or (ff) a nut-like odor, preferably 5-methyl-(E)-2-hepten-4-one, γ-heptalactone, 2-acetylpyrrole, 3-octen-2-one, dihydromethylcyclopentapyrazine, acetylthiazole, 2-octenal, 2,4-heptadienal, 3-octenone, hydroxypentanone, octanol, dimethylpyrazine, methylquinoxaline and/or acetylpyrroline or (gg) an orange-like odor, preferably methyl octanoate, undecanone, decyl alcohol, limonene and/or 2-decenal or (hh) an orange peel-like odor, preferably decanal and/or β-carene or (ii) a peach-like odor, preferably γ-nonalactone, (Z)-6-dodecene-γ-lactone, δ-decalactone, R-δ-decenolactone, hexyl hexanoate, 5-octanolide, γ-decalactone and/or δ-undecalactone or (jj) a peppermint-like odor, preferably methyl salicylate and/or l-menthol or (kk) a pine-like odor, preferably α-p-dimethylstyrene, β-pinene, bornyl benzoate, δ-terpinene, dihydroterpinyl acetate and/or α-pinene or (ll) a pineapple-like odor, preferably propyl butyrate, propyl propanoate and/or ethyl acetate or (mm) a plum-like odor, preferably benzyl butanoate, or (nn) a raspberry-like odor, preferably β-ionone or (oo) a rose-like odor, preferably β-phenethyl acetate, 2-ethylhexanol, geranyl valerate, geranyl acetate, citronellol, geraniol, geranyl butyrate, geranyl isovalerate, citronellyl butyrate, citronellyl acetate, isogeraniol, tetrahydro-4-methyl-2-(2-methyl-1-propenyl )-2,5-cis-2H-pyran, isogeraniol, 2-phenylethyl alcohol, citronellyl valerate and/or citronellyl isobutyrate, or (pp) a spearmint-like odor, preferably carvyl acetate and/or carveol, or (qq) a strawberry-like odor, preferably hexyl methylbutyrate, methyl cinnamate, pentenal, methyl cinnamate or (rr) a sweetish odor, preferably benzyl alcohol, ethyl phenylacetate, tridecanal, nerol, methyl hexanoate, linalyl isovalerate, undecanaldehyde, caryophyllene oxide, linalyl acetate, safranal, uncineol, phenylethanal, p-anisaldehyde, eudesmol, ethylmethylpyrazine, citronellyl butyrate, 4-methyl-3-penten-2-one, nonyl acetate, 10-epi-γ-eudesmol, β-bisabolol, (Z)-6-dodecene-γ-lactone, β-farnesene, 2-dodecenal, γ-dodecalactone, epoxy-β-ionone, 2-undecenal, styrene glycol, methyl furaneol, (−)-cis-rose oxide, (E)-β-ocimene, dimethylmethoxyfuranone, 1,8-cineole, ethylbenzaldehyde, 2-pentylthiophene, α-farnesene, methionol, 7-methoxycoumarin, (Z)-3-hexenyl 2-methylbutanoate, o-aminoacetophenone, viridiflorol, isopiperitone, β-sinensal, ethyl vanillate, methyl butanoate, p-methoxystyrene, 6-methoxyeugenol, 4-hexanolide, δ-dodecalactone, sesquiphellandrene, diethyl malate, linalyl butyrate, guaiacol, coumarin, methyl benzoate, isopropyl benzoate, safrole, durene, γ-butyrolactone, ethyl isobutyrate and/or furfural or (ss) a vanilla-like odor, preferably vanillin, methyl vanillate, acetovanillone and/or ethyl vanillate, or (tt) a water melon-like odor, preferably 2,4-nonadienal or (uu) a wood-like odor, preferably α-muurolene, cadina-1,4-dien-3-ol, isocaryophyllene, eudesmol, α-ionone, bornyl butyrate, (E)-α-bergamotene, linalool oxide, ethylpyrazine, 10-epi-γ-eudesmol, germacrene B, trans-sabinene hydrate, dihydrolinalool, isodihydrocarveol, β-farnesene, β-sesquiphellandrene, δ-elemene, α-calacorene, epoxy-β-ionone, germacrene D, bicyclogermacrene, alloaromadendrene, α-thujene, oxo-β-ionone, (−)-γ-elemene, γ-muurolene, sabinene, α-guaiene, α-copaene, γ-cadinene, nerolidol, β-eudesmol, α-cadinol, δ-cadinene, 4,5-dimethoxy-6-(2-propenyl )-1,3-benzodioxole, [1ar-(1a-alpha,4a-alpha,7alpha,7a-beta,7b-alpha)]-decahydro -1,1,7-trimethyl-4-methylene-1H-cycloprop[e]azulene, α-gurjunene, guaiol, α-farnesene, γ-selinene, 4-(1-methylethyl)-benzenemethanol, perillene, elemol, α-humulene, β-caryophyllene and/or β-guaiene or (vv) mixtures of the above.

It is particularly advantageous to use perfume oils which are generally associated with specific impressions. A perfume oil may advantageously evoke associations with impressions such as "cleanness" and "freshness" which are generally connected with using washing agents. Another perfume oil may advantageously promote the impression of "care".

Odoriferous substances which are preferred for the purposes of the present invention and may advantageously be used to impart or accompany the impression of "cleanness" and "freshness" are bergamot oil, tangerine oil, dimethyl anthranilate, aldehyde(s) C11, dihydromyrcenol, 4-tert.-butylcyclohexyl acetate, allyl amyl glycolate, tetrahydrolinalool, 6-methyl-gamma-ionone, isobornyl acetate, cyclovertal, ethyl linalool, aldehyde C12, Dynascone 10, limonene, orange oil, isobornyl acetate, eucalyptus oil (globulus), Calone, cyclovertal, ethyl-2-methyl butyrate, tetrahydrolinalool, aldehyde C10, styrolyl acetate, OTBCA, waterfruit base, citronitrile, Undecavertol, styrolyl acetate, Tonalid and/or dihydromethyl jasmonate, but in particular dihydromyrcenol and/or 4-tert.-butylcyclohexyl acetate. Preferred perfume oils may consequently comprise at least one of the above-stated odoriferous substances.

Odoriferous substances which are preferred for the purposes of the present invention and may be used to enhance or accompany the impression of a "caring action" are aldehyde C14, gamma decalactone, cyclamen aldehyde, lilial, Troenan, canthoxal, citronellol, geraniol, musk, phenylethyl alcohol, dihydrofloriffone, DMBCA, Phenirat, phenylethyl isobutyrate, rose oxide, Jasmelia, hexylcinnamaldehyde (alpha), beta ionone, ylang, cyclohexyl salicylate, hexenyl salicylate (cis-3), sandelice, santobar, Bacdanol, guaiacwood oil, Iso E Super, Timberol (forte), norlimbanol, ambroxan, cinnamyl alcohol, cyclopentadecanolide, nirvanol, Javanol, aldehyde C11, Habanolide, maltol, benzyl acetone, coumarin, benzyl salicylate, melonal, galbanum (oil), ethylvanillin, Koavone, PTBCA 25 cis, hedione, lilial, dihydroflorif-fone, isoraldeine, methyl palmitate, methyl oleate and/or methyl myristate. Preferred perfume oils may consequently comprise at least one of the above-stated odoriferous substances.

According to another preferred embodiment, the product according to the invention contains at least one odoriferous substance, preferably 2, 3 or more odoriferous substances, from the list galaxolide, dihydromyrcenol, 4-tert.-butylcyclohexyl acetate, gamma-iso-methylionone, tetrahydrolinalool, hexylcinnamaldehyde, lilial, linalool, amylcinnamaldehyde, 6-methyl-gamma-ionone, methyl oleate, neryl acetate, 15-pentadecalactone, phenoxyethyl isobutyrate, phenylethyl methanoate, α-pinene, b-pinene, rose oxides, sabinene, anethole, benzoic acid 2-hydroxypentyl ester, diphenyl ether, benzophenone, cyclamen aldehyde, α-damascone, decanal, dicyclopentadiene alcohol, allylcyclohexyl propionate, isobornyl acetate, bornyl acetate, dihydromethyl jasmonate, eucalyptol, n-dodecanol, ethyl palmitate, geraniol acetate, hexyl acetate, n-hexyl salicylate, α-ionone, methyl palmitate, 2-naphthyl methyl ketone, iso-propyl myristate, rose phenone, widdrene, styrallyl acetate, thujopsene, dimethylbenzylcarbinyl butyrate, limonene, dimethylbenzylcarbinyl acetate, citronellol, 2-tert-butylcyclohexanol, caryophyllene, ethyl stearate, Tonalid, 2,4-hexadienal, methanoazulene, methyl laurate, methyl myristate, 2-methylundecanal, myrcene, nonanal, nopyl acetate, 15-pentadecalactone, beta-phellandrene, 3-phenyl-2-methylpropene, rose acetate, traseolide and/or α-terpineol.

For the purposes of the present invention, it likewise corresponds to a preferred embodiment for the perfume oils present to contain at least one, preferably at least two, advantageously at least three, more advantageously at least four, still more advantageously at least five, in particular at least six fragrance alcohols, which are preferably selected from acetovanillone, allyl amyl glycolate, allyl isoamyl glycolate, α-amylcinnamyl alcohol, anisyl alcohol, benzoin, benzyl alcohol, benzyl salicylate, 1-butanol, butyl lactate, 2-t-butyl-5-methylphenol, 2-t-butyl-6-methylphenol, carvacrol, carveol, 4-carvomenthenol, cedrol, cetyl alcohol, cinnamic alcohol, citronellol, o-cresol, m-cresol, p-cresol, crotyl alcohol, decahydro-2-naphthol, 1-decanol, 1-decen-3-ol, 9-decen-1-ol, diethyl malate, diethyl tartrate, dihydrocarveol, dihydromyrcenol, 2,6-diiso-propylphenol, dimethicone copolyol, 2,6-dimethoxyphenyl, 1,1-dimethoxy-3,7-dimethyloctan-7-ol, 2,6-dimethyl-4-heptanol, 2,6-dimethylheptan-2-ol, 6,8-dimethyl-2-nonanol, 3,7-dimethyl-2,6-octadien-1-ol, 3,7-dimethyl-1,6-octadien-3-ol, 3,7-dimethyl-1-octanol, 3,7-dimethyl-3-octanol, 3,7-dimethyl-6-octen-1-ol, 3,7-dimethyl-7-octen-1-ol, Dimetol, 2-ethylfenchol, 4-ethylguaiacol, 2-ethyl-1-hexanol, ethyl 2-hydroxybenzoate, ethyl 3-hydroxybutyrate, 3-ethyl-2-hydroxy -2-cyclopenten-1-on, ethyl 2-hydroxycaproate, ethyl 3-hydroxy-hexanoate, ethyl lactate, ethylmaltol, p-ethylphenol, ethyl salicylate, eugenol, farnesol, fenchyl alcohol, geraniol, glucose pentaacetate, glycerol, glyceryl monostearate, guaiacol, 1-heptanol, 2-heptanol, 3-heptanol, cis-4-heptenol, cis-3-heptenol, n-hexanol, 2-hexanol, 3-hexanol, cis-2-hexenol, cis-3-hexenol, trans-3-hexenol, 4-hexenol, cis-3-hexenylhydrocinnamyl alcohol, 2-hydroxy-benzoate, 2-hydroxyacetophenone, 4-hydroxybenzyl alcohol, 3-hydroxy-2-butanone, hydroxycitronellal, 4-(4-hydroxy-3-methoxyphenyl)-2-butanone, 2-hydroxy-3-methyl-2-cyclopenten-1-one, 4-(p-hydroxyphenyl)-2-butanone, 2-hydroxy-3,5,5-trimethyl-2-cyclohexenone, delta-isoascorbic acid, isoborneol, isoeugenol, isophytol, isopropyl alcohol, p-isopropylbenzyl alcohol, 4-isopropylcyclohexanol, 3-isopropylphenol, 4-isopropyl phenol, 2-isopropyl-phenol, isopulegol, lauryl alcohol, linalool, maltol, menthol, 4-methoxybenzyl alcohol, 2-methoxy-4-methylphenol, 2-methoxy-4-propylphenyl, 2-methoxy-4-vinylphenol, α-methylbenzyl alcohol, 2-methylbutanol, 3-methyl-2-butanol, 3-methyl-2-buten-1-ol, 2-methyl-3-buten-2-ol, methyl 2,4-di hydroxy-3,6-dimethylbenzoate, 4-methyl-2,6-dimethoxyphenyl, methyl N-3,7-dimethyl-7-hydroxyoctylideneanthranilate, methyl 3-hydroxyhexanoate, 6-methyl-5-hepten-2-ol, 2-methylpentanol, 3-methyl-3-pentanol, 2-methyl-4-phenylbutan-2-ol, 2-methyl-3-phenylpropan-2-ol, methylsalicylate, 3-methyl-5-(2,2,3-trimethyl-3-cyclopent-1-yl)-4-penten-2-ol, 2-methyl-2-vinyl-5-(1-hydroxy-1-methylethyl )-3,4-dihydrofuran, myrtenol, neohesperidindihydrochalcone, neomenthol, nerol, nerolidol, trans-2-cis-6-nonadienol, 1,3-nonanediol acetate, nonadyl, 2-nonanol, cis-6-nonen-1-ol, trans-2-nonen-1-ol, nonyl alcohol, 1-octanol, 2-octanol, 3-octanol, cis-3-octen-1-ol, cis-2-octen-1-ol, trans-2-octen-1-ol, cis-6-octen-1-ol, cis-octen-1-ol, 1-octen-3-ol, oleyl alcohol, patchouli alcohol, 3-pentanol, n-pentanol, 2-pentanol, 1-penten-1-ol, cis-2-penten-1-ol, perillyl alcohol, 2-phenoxyethanol arabinogalactan, beta-phenethyl alcohol, phenethyl salicylate, phenol, phenylacetaldehyde glyceryl acetal, 3-phenyl-1-pentanol, 5-phenyl-1-pentanol, 1-phenyl-1-pentanol, 1-phenyl-2-pentanol, 1-phenyl-3-methyl-1-pentanol, phytol, pinacole, polyalkylene glycol, Polysorbate 20, Polysorbate 60, Polysorbate 80, prenol, n-propanol, propenyl guaethol, propylene glycol, 2-propylphenyl, 4-propylphenyl, resorcinol, retinol, salicyl-aldehyde, sorbitan monostearate, sorbitol, stearyl alcohol, syringaldehyde, α-terpineol, tetrahydrogeraniol, tetrahydrolinalool, tetrahydromyrcenol, thymol, triethyl citrate, 1,2,6-trihydroxyhexane, p-α,α-trimethylbenzyl alcohol, 2-(5,5,6-trimethylbicyclo[2.2.1]hept-2-yl)cyclohexanol, 5-(2,2,3-trimethyl-3-cyclopentenyl)-3-methylpentan-2-ol, 3,7,11-trimethyl-2,6,10-dodecatrien-1-ol, 3,7,11-trimethyl-1,6,10-dodecatrien-3-ol, 3,5,5-trimethyl-1-hexanol, 10-undecen-1-ol, undecyl alcohol, vanillin, o-vanillin, vanillyl butyl ether, 4-vinylphenol, 2,5-xylenol, 2,6-xylenol, 3,5-xylenol, 2,4-xylenol and/or xylose.

For the purposes of the present invention, it likewise corresponds to a preferred embodiment for the perfume oils present to contain at least one, preferably at least two, advantageously at least three, more advantageously at least four, still more advantageously at least five, in particular at least six fragrances with carbonyl functions, which are preferably selected from 4-acetoxy-3-pentyltetrahydropyran, allyl cinnamate, allyl 2-ethylbutyrate, allyl cyclohexanepropionate, allyl heptanoate, allyl hexanoate, allyl isovalerate, allyl nonanoate, allyl octanoate, allyl phenoxyacetate, allyl phenylacetate, allyl propionate, α-amylcinnamyl acetate, amyl octanoate, anisyl acetate, anisyl phenylacetate, benzyl acetate, benzyl acetoacetate, benzyl butyrate, benzyl cinnamate, benzyl isobutyrate, benzyl isovalerate, benzyl phenylacetate, benzyl propionate, bornyl acetate, bornyl isovalerate, bornyl valerate, butyl acetate, butyl butyrate, butyl butyryl lactate, 4-t-butylcyclohexyl acetate, butyl heptanoate, butyl hexanoate, butyl isobutyrate, butyl isovalerate, butyl laurate, butyl propionate, butyl stearate, 3-butylidenephthalide, butyl 2-methylbutyrate, butyl 10-undeceneoate, gamma-butyrolactone, carvyl acetate, carvyl propionate, caryophyllene acetate, cedryl acetate, trans-cinnamyl acetate, trans-cinnamyl butyrate, cinnamyl cinnamate, cinnamyl isobutyrate, citronellyl acetate, citronellyl butyrate, citronellyl isobutyrate, citronellyl propionate, citronellyl valerate, cyclohexane ethylacetate, cyclohexyl acetate, cyclohexyl butyrate, cyclohexyl isovalerate, cyclohexyl propionate, delta-decalactone, epsilon-decalactone, gamma-decalactone, 4-decanolide, decyl acetate, decyl butyrate, decyl propionate, diethyl malonate, diethyl sebacate, diethyl succinate, dihydrocarvyl acetate, dihydrocoumarin, dihydromyrcenyl acetate, dihydronordicyclopentadienyl acetate, dihydroterpinyl acetate, 3,7-dimethyl-1,6-octadien -3-yl acetate, 3,7-dimethyl-1,6-octadien-3-yl propionate, 3,7-dimethyl-octan-3-yl acetate, α,α-dimethylphenethyl acetate, α,α-dimethylphenethyl butyrate, 6,10-dimethyl-5,9-undecadien-2-yl acetate, delta-dodecalactone, epsilon-dodecalactone, gamma-dodecalactone, ethyl acetate, ethyl aceto-acetate, ethyl 6-acetoxyhexanoate, ethyl 2-acetyl-3-phenylpropionate, ethylbenzoyl acetate, 2-ethylbutyl acetate, ethyl butyrate, ethyl cinnamate, ethyl cyclohexanepropionate, ethyl decanoate, ethylene brassylate, ethyl 2-ethyl-6,6-dimethyl -2-cyclohexene carboxylate, ethyl 2,3-epoxybutyrate, ethyl 2-methyl-4-pentenoate, ethyl heptanoate, ethyl hexanoate, ethyl trans-3-hexenoate, 2-ethylhexyl acetate, ethyl isobutyrate, ethyl isovalerate, ethyl laurate, ethyl 2-mercaptopropionate, ethyl 3-mercaptopropionate, ethyl 2-methylbutyrate, ethyl 2-methylpentanoate, ethyl(methylthio)acetate, methyl(methylthio)-acetate, methyl 2-(methylthio)propionate, ethyl myristate, ethyl nonanoate, ethyl octanoate, ethyl palmitate, ethyl phenylacetate, ethyl 3-phenylpropionate, ethyl 3-phenyl-2,3-epoxybutyrate, ethyl 3-phenylpropionate, ethyl propionate, ethyl stearate, ethyl 2,3,6,6-tetramethyl-2-cyclohexene carboxylate, ethyl(p-tolyloxy)acetate, ethyl undecanoate, ethyl valerate, eugenyl acetate, fenchyl acetate, geranyl acetate, geranyl butyrate, geranyl phenylacetate, geranyl propionate, guaiacyl phenylacetate, guaiac wood acetate, gamma-hepta-lactone, heptyl acetate, heptyl butyrate, heptyl isobutyrate, omega-6-hexadecene lactone, delta-hexyllactone, gamma-hexyllactone, 3-hexenyl acetate, cis-3-hexenyl 2-methylbutanoate, cis-3-hexenyl cis-3-hexenoate, cis-3-hexenyl phenylacetate, trans-2-hexenyl acetate, hexyl acetate, hexyl butyrate, hexyl hexanoate, hexyl isobutyrate, hexyl propionate, hexyl 2-methylbutanoate, hexyl 3-methylbutanoate, hexyl phenylacetate, isoamyl acetate, isoamyl acetoacetate, isoamyl butyrate, isoamyl cinnamate, isoamyl hexanoate, isoamyl isobutyrate, isoamyl isovalerate, isoamyl laurate, isoamyl nonanoate, isoamyl octanoate, isoamyl phenylacetate, isoamyl propionate, isobornyl acetate, isobornyl propionate, isobutyl acetate, isobutyl butyrate, isobutyl cinnamate, isobutyl hexanoate, isobutyl isobutyrate, isobutyl 2-methylbutyrate, isobutyl propionate, isoeugenyl acetate, isopropyl cinnamate, isobutyl phenylacetate, isopropyl acetate, isopropyl butyrate, isopropyl isobutyrate, isopropyl myristate, isopropyl palmitate, isopropyl phenylacetate, lauryl acetate, linalyl acetate, linalyl butyrate, linalyl isovalerate, menthalactone, menthyl acetate, menthyl cyclohexanecarboxylate, menthyl isovalerate, 4-methoxybenzyl acetate, 4-methoxybenzyl propionate, 2-methoxyphenyl acetate, 2-methoxy-4-(1-propenyl)phenyl acetate, methyl acetate, α-methylbenzyl acetate, α-methylbenzyl butyrate, α-methylbenzyl propionate, 2-methylbutyl acetate, 2-methylbutyl butyrate, 2-methylbutyl isovalerate, 3-methylbutyl 2-methylbutanoate, 2-methylbutyl 2-methylbutanoate, methyl p-t-butylphenylacetate, methyl butyrate, methyl cinnamate, methyl decanoate, methyl heptanoate, methyl hexanoate, methyl isobutyrate, methyl isovalerate, methyl laurate, methyl N-2-methyl-3-(4-t-butylphenylpropylidene)anthranilate, methyl myristate, methyl nonanoate, methyl octanoate, methyl palmitate, 4-(4-methyl-3-pentenyl)-3-cyclohexenylmethyl acetate, methyl 2-methylbutyrate, 2-methyl-6-methylene-7-octen-2-yl acetate, methyl 4-methylvalerate, methyl 2-methylpentanoate, methyl phenoxyacetate, 2-methyl-3-phenylpropan-2-yl acetate, methyl 3-phenylpropionate, methyl propionate, 2-methylpropylphenyl acetate, methyl phenylacetate, 2-methyl-3-phenylpropan-2-yl acetate, methyl stearate, methyl (p-tolyloxy)acetate, methyl 9-undecenoate, methyl valerate, myrtenyl acetate, neryl acetate, neryl butyrate, neryl isobutyrate, delta-nonalactone, gamma-nonalactone, 1,3-nonanediol diacetate, nonyl acetate, octahydrocoumarin, gamma-octalactone, 1-octen-3-yl acetate, 1-octen-3-yl butyrate, octyl acetate, octyl butyrate, octyl isobutyrate, octyl isovalerate, octyl octanoate, octyl propionate, oxacycloheptadec-10-en-2-one, omega-pentadecalactone, pentyl acetate, pentyl butyrate, pentyl hexanoate, pentyl octanoate, phenethyl acetate, phenethyl butyrate, phenethyl cinnamate, phenethyl hexanoate, phenethyl isobutyrate, phenethyl isovalerate, phenethyl 2-methylbutyrate, phenethyl 2-methylbutyrate, phenethyl 2-methylpropionate, phenethyl octanoate, phenethyl phenylacetate, phenethyl propionate, phenoxyethyl propionate, 2-phenoxyethyl 2-methylpropionate, 3-phenyl-2-propenyl propionate, 3-phenylpropyl acetate, 2-phenylpropyl butyrate, 2-phenylpropyl isobutyrate, 2-phenylpropyl isovalerate, piperonyl acetate, piperonyl isobutyrate, prenyl acetate, propyl acetate, propyl butyrate, propyl heptanoate, propyl hexanoate, 3-propylidenephthalide, propyl isobutyrate, propyl propionate, propyl phenylacetate, sucrose octaacetate, terpinyl acetate, terpinyl butyrate, terpinyl isobutyrate, terpinyl propionate, tetrahydrofurfuryl acetate, tetrahydrofurfuryl butyrate, tetrahydrofurfuryl propionate, tetrahydro-linalyl acetate, 2,6,6,8-tetramethyltricyclo[5.3.1.0(1.5)]udecan-8-yl acetate, p-tolyl acetate, p-tolyl isobutyrate, p-tolyl phenylacetate, triacetin, tributyl acetylcitrate, tributyrin, tripropionine, 3,5,5-trimethylhexyl acetate, 6-undecalactone, gamma-undecalactone, gamma-valerolactone, vanillin acetate, vanillyl isobutyrate, 1-vinyl-2-(1-methylpropyl)cyclohexyl acetate, whiskey lactone, butyraldehyde, citronellal, decanal, cis-4-decenal, trans-4-decenal, 2,4-dimethyl-3-cyclohexene-1-carbaldehyde, 2,6-dimethyl-5-heptenal, 3,7-dimethyloctanal, 2-ethylbutyraldehyde, glutaric dialdehyde, heptanal, cis-4-heptenal, hexanal, hydrocinnamaldehyde, isobutyraldehyde, 3-(p-isopropylphenyl)-propionaldehyde, isovaleraldehyde, lauric aldehyde, 2-methylbutyraldehyde, 2-methyl-3-(p-isopropylphenyl)propionaldehyde, 2-methylpentanal, 4-(4-methyl-3-pentenyl)-3-cyclohexene-1-carbaldehyde, 4-methylphenylacetaldehyde, 3-(methylthio)butanal, 2-methyl-4-(2,6,6-trimethyl -2-cyclohexen-1-yl)butanal, 2-methylundecanal, nonanal, cis-6-nonenal, octanal, phenylacetaldehyde, 2-phenylpropionaldehyde, 3-phenylpropionaldehyde, propionaldehyde, p-tolylacetaldehyde, tridecanal, 2,4,6-trimethyl-3-cyclohexene-1-carbaldehyde, 2,6,10-trimethyl-9-undecanal, 7-undecenal, 8-undecenal, 9-undecenal, 10-undecenal, valeraldehyde, acetanisole, 1'-acetonaphthone, 2'-acetonaphthone, acetone, acetophenone, 2-acetoxy-2,5-dimethyl-3(2 H)furanone, 2-acetylcyclopentanone, 4-acetyl-1,1-dimethyl -6-t-butylindan, 7-acetyl-1,1,3,4,4,6-hexamethylindan, 2-acetyl-2-thiazoline, 6-acetyl-1,1,2,4,4,7-hexamethyltetralin, allyl α-ionone, benzylidene acetone, 2,3-butanedione, 2-sec-butylcyclohexanone, 5-t-butyl-3,5-dinitro-2,6-dimethylacetophenone, butyrophenone, camphor, 2-decanone, 3-decanone, 3-decen-2-on, dihydrocarvone, dihydro-beta-ionone, dihydrojasmone, 4,5-dihydro-3(2H)-thiophenone, 2',4'-dimethylacetophenone, 3,4-dimethyl-1,2-cyclopentadione, 3,5-dimethyl-1,2-cyclopentadione, 2,6-dimethyl-4-heptanone, 1,3-diphenol-2-propanone, 4-(1-ethoxyvinyl)-3,3,5,5-tetramethylcyclohexanone, p-ethylacetophenone, ethyl vinyl ketone, geranyl acetate, 2,3-heptanedione, 2-heptanone, 3-heptanone, 4-heptanone, 3,4-hexanedione, 3-hexanone, 4-hexen-3-one, 2-hexylidene cyclopentanone, α-ionone, beta-ionone, 4-isobutyl-2,6-dimethyl-3,5-dinitroacetophenone, isophorone, 6-isopropyl-decahydro -2-naphthone, cis-jasmone, livescone, 4-methoxyacetophenone, 4-(p-methoxyphenyl)-2-butanone, 4'-methylacetophenone, 3-methyl-1,2-cyclohexanedione, 3-methyl-2-cyclohexen-1-one, 2-(2-(4-methyl-3-cyclohexen-1-yl) propyl)-cyclopentanone, 3-methyl-2-cyclopenten-1-one, methyl dihydrojasmonate, methyl ethyl ketone, 2-methyl-3-heptanone, 5-methyl-2-hepten -4-one, 6-methyl-5-hepten-2-one, 5-methyl-α-ionone, 1-(2-methyl-5-isopropyl -2-cyclohexenyl)-1-propanone, 4-methyl-2-pentanone, 3-methyl-2-(2-pentenyl) -2-cyclopenten-1-one, 4-methyl-1-phenyl-2-pentanone, 2-methyltetra-hydrofuran -3-one, 2-methyltetrahydrothiophen-3-one, 2-nonanone, 3-nonanone, 2-octanone, 3-octanone, 1-octen-3-one, 3-octen-2-one, 4-oxoisophorone, 2-pentadecanone, 2,3-pentanedione, 2-pentanone, 3-pentanone, 3-penten-2-one, 1-phenyl-1,2-propanedione, propiophenone, pulegone, 2-tridecanone, 2,2,6-trimethylcyclohexanone, 4-(2,6,6-trimethyl-2-cyclohexen-1-yl) -3-methyl-3-buten-2-one, 2-undecanone and 6-undecanone.

All the above-stated odoriferous substances may be used alone or in mixture according to the present invention with the above-stated advantages.

In particular, it is advantageous for the perfume oil present in the PIT emulsion according to the invention to contain fragrance precursors. It has surprisingly been found that their action in the dryer application according to the invention is still further enhanced or extends beyond the success previously achievable with them.

A fragrance precursor is a compound which liberates a desired odor and/or fragrance molecule by breakage of a chemical bond, for example by hydrolysis. A fragrance precursor is typically formed by chemically binding a desired fragrance raw material with a carrier, preferably a slightly or moderately volatile carrier. The combination gives rise to a less volatile and more strongly hydrophobic fragrance precursor with improved attachment to materials. The fragrance is subsequently liberated by breaking the bond between the fragrance raw material and the carrier, for example by a change in pH value (for example in the event of perspiration during wear), atmospheric humidity, heat and/or sunlight during storage or drying on the washing line.

The fragrance raw materials for use in fragrance precursors are typically saturated or unsaturated, volatile compounds which contain an alcohol, an aldehyde and/or a ketone group. Fragrance raw materials of use herein include any fragrant substances or mixtures of substances.

Particularly advantageous fragrance precursors usable according to the invention comply with the formula

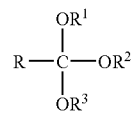

in which R means hydrogen, linear C1-C8 alkyl, branched C3-C20 alkyl, cyclic C3-C20 alkyl, branched cyclic C6-C20 alkyl, linear C6-C20 alkenyl, branched C6-C20 alkenyl, cyclic C6-C20 alkenyl, branched cyclic C6-C20 alkenyl, substituted or unsubstituted C6-C20-aryl and mixtures thereof; R1, R2 and R3 independently mean linear, branched or substituted C1-C20 alkyl; linear, branched or substituted C2-C20 alkenyl; substituted or unsubstituted, cyclic C3-C20 alkyl; substituted or unsubstituted C6-C20 aryl, substituted or unsubstituted C2-C40 alkyleneoxy; substituted or unsubstituted C3-C40 alkyleneoxyalkyl; substituted or unsubstituted C6-C40 alkylenearyl; substituted or unsubstituted C6-C32 aryloxy; substituted or unsubstituted C6-C40 alkyleneoxyaryl; C6-C40-oxyalkylenearyl and mixtures thereof. Use of such substances corresponds to a preferred embodiment of the invention.

A preferred embodiment is provided if the fragrance precursor usable according to the invention liberates compounds complying with the formula

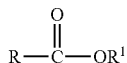

in which R is hydrogen, methyl, ethyl, phenyl and mixtures thereof; R1 is selected from the group consisting of 4-(1-methylethyl)cyclohexanemethyl, 2,4-dimethyl-3-cyclohexen-1-ylmethyl, 2,4-dimethylcyclohex-1-ylmethyl, 2,4,6-trimethyl-3-cyclohexen-1-ylmethyl, 2-phenylethyl, 1-(4-isopropylcyclohexyl)ethyl, 2,2-dimethyl-3-(3-methylphenyl)propan-1-yl, 3-phenyl-2-propen-1-yl, 2-methyl-4-(2,2,3-trimethyl-3-cyclopenten-1-yl)-2-buten-1-yl, 3-methyl-5-phenylpentan-1-yl, 3-methyl-5-(2,2,3-trimethyl-3-cyclopent-1-yl) -4-penten-2-yl, 2-methyl-4-phenyl-pentan-1-yl, cis-3-hexen-1-yl, 3,7-dimethyl-6-octen-1-yl, 3,7-dimethyl-2,6-octadien-1-yl, 7-methoxy-3,7-dimethyloctan-2-yl, 6,8-dimethylnonan-2-yl, cis-6-nonen-1-yl, 2,6-nonadien-1-yl, 4-methyl-3-decen-5-yl, benzyl, 2-methoxy-4-(1-propenyl)phenyl, 2-methoxy-4-(2-propenyl)phenyl and mixtures thereof. Use of such substances corresponds to a preferred embodiment of the invention.

Further particularly advantageous fragrance precursors usable according to the invention are acetals or ketals, preferably complying with the formula

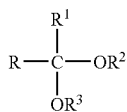

in which R is linear C1-C20 alkyl, branched C3-C20 alkyl, cyclic C6-C20 alkyl, branched cyclic C6-C20 alkyl, linear C2-C20 alkenyl, branched C3-C20 alkenyl, cyclic C6-C20 alkenyl, branched cyclic C6-C20 alkenyl, substituted or unsubstituted C6-C20 aryl and mixtures thereof; R1 is hydrogen or R; R2 and R3 are in each case mutually independently selected from the group consisting of linear C1-C20 alkyl, branched C3-C20 alkyl, cyclic C3-C20 alkyl, branched cyclic C6-C20 alkyl, linear C6-C20 alkenyl, branched C6-C20 alkenyl, cyclic C6-C20 alkenyl, branched cyclic C6-C20 alkenyl, C6-C20 aryl, substituted C7-C20 aryl and mixtures thereof. Use of such substances corresponds to a preferred embodiment of the invention.

Further particularly advantageous fragrance precursors usable according to the invention comply with the formula

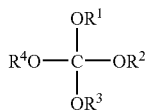

in which R1, R2, R3 and R4 are mutually independently linear, branched or substituted C1-C20 alkyl; linear, branched or substituted C2-C20 alkenyl; substituted or unsubstituted, cyclic C5-C20 alkyl; substituted or unsubstituted C6-C20 aryl, substituted or unsubstituted C2-C40 alkyleneoxy; substituted or unsubstituted C3-C40 alkyleneoxyalkyl; substituted or unsubstituted C6-C40 alkylenearyl; substituted or unsubstituted C6-C32 aryloxy; substituted or unsubstituted C6-C40 alkyleneoxyaryl; C6-C40-oxyalkylenearyl; and mixtures thereof. Use of such substances corresponds to a preferred embodiment of the invention.

Particularly suitable fragrance precursors are reaction products of compounds which comprise at least one primary and/or secondary amine group, for example an amino-functional polymer, in particular an amino-functional silicone, and a fragrance component which is selected from ketone, aldehyde and mixtures thereof. Use of such substances corresponds to a preferred embodiment of the invention.

If the perfume oil which is present comprises odoriferous substances with a boiling point of above 250° C. and a logP value of ≧3.0, a preferred embodiment is provided. Use of such odoriferous substances permits still greater improvement of scenting in terms of attractiveness, intensity and durability of the odor impression.

If the perfume oil which is present consists to an extent of at least 1, 5, 10 or 15 wt. % of odoriferous substances with a boiling point of above 250° C. and a logP value of ≧3.0, a preferred embodiment is provided. It has been found that PIT emulsions according to the invention which contain such minimum quantities of odoriferous substances with a boiling point of above 250° C. and a logP value of ≧3.0 exhibit particularly advantageous fragrance properties. For example, a still longer lasting odor impression on the laundry may be achieved. The absorption behavior of the odoriferous substances in the dryer onto the laundry may likewise be still further improved such that the laundry is more intensely fragrant for still longer.

The octanol/water distribution coefficient of a fragrance component is the ratio between its equilibrium concentration in octanol and in water. Since the distribution coefficients of the fragrance components often have elevated values, for example of 1000 or higher, they are conveniently in the form of the base 10 logarithm, which is then known as the log-P value. Preferred odoriferous substances of this invention exhibit a logP of ≧3.0 or higher, for example of ≧3.1, preferably of ≧3.2, in particular of ≧3.3.

The logP value of numerous odoriferous substances is documented; for example the Pomona92 database, available from Daylight Chemical Information Systems, Inc., (Daylight CIS), Irvine, Calif., contains numerous logP-values, together with original literature citations. However, logP values are most conveniently calculated using "CLOGP" software program, which is also available from Daylight CIS. This software program also lists the experimental logP-values, if they are available in the Pomona92 database. The "calculated logP" (ClogP value) is [determined] by fragment approximation according to Harsch and Leo (see A. Leo, in Comprehensive Medicinal Chemistry, vol. 4, C. Harsch, P. G. Sammens, J. B. Taylor and C. A. Ransden, eds., p. 295, Pergamon Press, 1990, included herein by reference). Fragment approximation is based on the chemical structure of each of the fragrance components and takes account of the numbers and types of atoms, atomic binding power and chemical bonding. ClogP values, which are the most reliable and most widely used estimated values for this physicochemical property, are preferably used for the purposes of the present invention instead of the experimental logP values for the purposes of selecting the fragrance components which are of use in the present invention.

The boiling points of numerous odoriferous substances are published, for example, in "Perfume and Flavor Chemicals (Aroma Chemicals)", S. Arctander, published by the author 1969, incorporated herein by reference. Other boiling point values may be obtained, for example from various, known handbooks of chemistry and databases. If a boiling point is only stated at a different pressure, generally at a pressure lower than the normal pressure of 760 mm Hg, the boiling point at standard pressure may be roughly estimated with the assistance of boiling point/pressure nomographs, such as those given in "The Chemist's Companion", A. J. Gordon and R. A. Ford, John Wiley & Sons. Publishers, 1972, pp. 30-36. Where applicable, the boiling point values may also be calculated by computer software on the basis of molecular structure data, such as that described are in "Computer-assisted Prediction of Normal Boiling Points of Pyrans and Pynoles", D. T. Starton et al., J. Chem. Inf. Comput. Sci., 32 (1992), pp. 306-316, "Computer-assisted Prediction of Normal Boiling Points of Furans, Tetrahydrofurans and Thiophenes", D. T. Starton et al., J. Chem. Inf. Comput. Sci., 31 (1992), pp. 301-310, and the references cited therein, and "Predicting Physical Properties from Molecular Structure", R. Murugan et al., Chemtech. June 1994, pp. 17-23. All the above-stated publications are incorporated by reference.

Table 1 below lists some examples of odoriferous substances which satisfy the criteria boiling point>250° C. and ClogP≧3. Those odoriferous substances which satisfy these criteria are also hereafter referred to as resistant odoriferous substances.

TABLE 1

Examples of resistant odoriferous substances

| Fragrance components | Approx. boiling point (° C.) | ClogP |
|---|---|---|
| Boiling point >250° C. and ClogP ≧3.0 | | |
| Allyl cyclohexanepropionate | 267 | 3.935 |
| Ambrettolide | 300 | 6.261 |
| Amyl benzoate | 262 | 3.417 |
| Amyl cinnamate | 310 | 3.771 |
| Amylcinnamaldehyde | 285 | 4.324 |
| Amylcinnamaldehyde dimethyl acetal | 300 | 4.033 |
| iso-Amyl salicylate | 277 | 4.601 |
| Aurantiol | 450 | 4.216 |
| Benzophenone | 306 | 3.120 |
| Benzyl salicylate | 300 | 4.383 |
| para-tert.-Butylcyclohexyl acetate | >250 | 4.019 |
| iso-Butylquinoline | 252 | 4.193 |
| beta-Caryophyllene; | 256 | 6.333 |
| Cardinene | 275 | 7.346 |
| Cedrol | 291 | 4.530 |
| Cedryl acetate | 303 | 5.436 |
| Cedryl formate | >250 | 5.070 |
| Cinnamyl cinnamate | 370 | 5.480 |
| Cyclohexyl salicylate | 304 | 5.265 |
| Cyclamen aldehyde | 270 | 3.680 |
| Dihydroisojasmonate | >300 | 3.009 |
| Diphenylmethane | 262 | 4.059 |
| Diphenyl oxide | 252 | 4.240 |
| Dodecane lactone | 258 | 4.359 |
| Iso E Super | >250 | 3.455 |
| Ethyl brassylate | 3321 | 4.554 |
| Ethylmethylphenyl glycinate | 260 | 3.165 |
| Ethyl undecylenate | 264 | 4.888 |
| Exaltolide | 280 | 5.346 |
| Galaxolide | >250 | 5.482 |
| Geranyl anthranilate | 312 | 4.216 |
| Geranyl phenylacetate | >250 | 5.233 |
| Hexadecanolide | 294 | 6.805 |
| Hexenyl salicylate | 271 | 4.716 |

TABLE 1-continued

Examples of resistant odoriferous substances

| Fragrance components | Approx. boiling point (° C.) | ClogP |
|---|---|---|
| Hexylcinnamaldehyde | 305 | 5.473 |
| Hexyl salicylate | 290 | 5.260 |
| alpha-Irone | 250 | 3.820 |
| Lilial (p-t-bucinal) | 258 | 3.858 |
| Linalyl benzoate | 263 | 5.233 |
| 2-Methoxynaphthalene | 274 | 3.235 |
| Methyl dihydrojasmone | >300 | 4.843 |
| gamma-n-Methylionone | 252 | 4.309 |
| Musk indanone | >250 | 5.458 |
| Musk ketone | m.p. = 137° C. | 3.014 |
| Musk tibetine | m.p. = 136° C. | 3.831 |
| Myristicin | 276 | 3.200 |
| Oxahexadecanolide-10 | >300 | 4.336 |
| Oxahexadecanolide-11 | m.p. = 35° C. | 4.336 |
| Patchouli alcohol | 285 | 4.530 |
| Phantolide | 288 | 5.977 |
| Phenylethyl benzoate | 300 | 4.058 |
| Phenylethyl phenylacetate | 325 | 3.767 |
| Phenylheptanol | 261 | 3.478 |
| Phenylhexanol | 258 | 3.299 |
| alpha-Santalol | 301 | 3.800 |
| Thibetolide | 280 | 6.246 |
| delta-Undecalactone | 290 | 3.830 |
| gamma-Undecalactone | 297 | 4.140 |
| Vetiveryl acetate | 285 | 4.882 |
| Yara-yara | 274 | 3.235 | m.p. is the melting point; these components have a boiling point greater than 250° C.

This table provides a sufficient number of non-limiting examples of resistant odoriferous substances which are preferably usable for the purposes of the present invention. The PIT emulsions of present invention preferably contain at least 3 different resistant odoriferous substances, more preferably at least 4 different resistant odoriferous substances, and still more preferably at least 5 different resistant odoriferous substances.

Non-resistant odoriferous substances are for the purposes of the present invention those odoriferous substances which exhibit a boiling point of lower than approx. 250° C. or a ClogP of less than approx. 3.0 or both a boiling point of less than approx. 250° C. and a ClogP of less than approx. 3.0. According to a preferred embodiment, non-resistant odoriferous substances are preferably minimized in the PIT emulsions of the present invention, i.e. the PIT emulsions preferably contain ≦60 wt. %, ≦55 wt. %, ≦50 wt. %, ≦45 wt. %, ≦40 wt. %, ≦35wt. %, ≦30wt. %, ≦25wt. %, ≦20wt. %, ≦15wt. %, ≦10wt. %, ≦5wt. %, ≧3 wt. %, ≧2 wt. % or even ≧1 wt. % of non-resistant odoriferous substances, wt. % relative to the total quantity of the odoriferous substances present in the PIT emulsion.

It may, however, be advantageous for non-resistant odoriferous substances to be used at least in small quantities, specifically for improving of the odor of the PIT emulsions themselves. The PIT emulsions of the present invention therefore preferably contain ≧1 wt. %, preferably ≧5 wt. %, more preferably ≧10 wt. %, still more preferably ≧15 wt. %, in particular even ≧20, ≧25 or even ≧30 wt. %, of non-resistant odoriferous substances, wt. % relative to the total quantity of the odoriferous substances present in the PIT emulsion.

It is very particularly preferred for the PIT emulsion according to the invention furthermore to contain an aromatherapy component.

Aromatherapy is the application of essential oils for influencing health and well-being. In the use according to the invention of PIT emulsions comprising an essential oil as an aromatherapy component, components of the essential oil are transferred onto the textiles and may have a positive influence on health and well-being when the textiles are worn. An essential oil may preferably be used as the aromatherapy component.

Essential oils are for example extracted from flowers, spices, herbs, woods or fibers and are complex mixtures of various organic molecules such as terpenes, ethers, coumarins, esters, aldehydes, phenyl esters, monoterpenols, phenols, monoterpenes, oxides, sesquiterpene ketones, sesquiterpenes and sesquiterpenols. Due to their small molecular structure, essential oils pass through the skin and/or mucous membranes into the bloodstream and tissues. In this manner, they can have an effect on the whole body.

Numerous essential oils may be put to aromatherapeutic use. Very particularly suitable essential oils include for example oils of *Abies sibirica, Amyris balsamifera*, aniseed (*Illicium verum*), lemon balm (*Melissa officinalis*), basil (*Ocimum basilicum*), *Pimenta acris*, scarlet beebalm (*Monarda didyma*), bergamot (*Citrus aurantium bergamia*), birch (*Betula alba*), bitter orange (*Citrus aurantium amara*), hibiscus, hundred-petaled rose (*Rosa centifolia*), *Calendula officinalis*, California nutmeg (*Torreya californica*), *Camellia sinensis, Capsicum frutescens* oleoresin, caraway (*Carum carvi*), cardamom (*Elettaria cardamomum*), cedar wood (*Cedrus atlantica*), *Chamaecyparis obtusa*, chamomile (*Anthemis nobilis*), cinnamon (*Cinnamomum cassia*), lemon grass (*Cymbopogon nardus*), clary sage (*Salvia sclarea*), clove (*Eugenia caryophyllus*), coriander (*Coriandrum sativum*), coriander seeds, *Cyperus esculentus*, cypress (*Cupressus sempervirens*), *Eucalyptus citriodora, Eucalyptus globulus*, fennel (*Foeniculum vulgare*), *Gardenia florida, Geranium maculatum*, ginger (*Zingiber officinale*), camelina (*Camelina sativa*), grapefruit (*Citrus grandis*), hops (*Humulus lupulus*), *Hypericum perforatum, Hyptis suaveolens*, indigo bush (*Dalea spinosa*), jasmine (*Jasminum officinale*), *Juniperus communis, Juniperus virginiana*, labdanum (*Cistus labdaniferus*), bayleaf (*Laurus nobilis*), lavandin (*Lavandula hybrida*), lavender (*Lavandula angustifolia*), lemon (*Citrus medica limonum*), lemon grass (*Cymbopogon schoenanthus*), *Leptospermum scoparium*, lime (*Citrus aurantifolia*), linden (*Tilia cordata*), *Litsea cubeba*, lovage (*Levisticum officinale*), *Citrus nobilis*, massoi bark, true chamomile (*Chamomilla recutita*), Moroccan chamomile, musk rose (*Rosa moschata*), myrrh (*Commiphora myrrha*), myrtle (*Myrtus communis*), *Picea excelsa*, nutmeg (*Myristica fragrans*), *Olax dissitiflora*, olibanum, opoponax, orange (*Citrus aurantium dulcis*), palmarosa (*Cymbopogon martini*), parsley seed oil (*Carum petroselinum*), passion flower (*Passiflora incarnata*), patchouli (*Pogostemon cablin*), *Pelargonium graveolens*, pennyroyal (*Mentha pulegium*), peppermint (*Mentha piperita*), pine (*Pinus palustris*), *Pinus pinea, Pinus pumiho, Pinus sylvestris*, rosemary (*Rosmarinus officinalis*), rose, rosewood (*Aniba rosaeodora*), rue (*Ruta graveolens*), sage (*Salvia officinalis*), *Sambucus nigra*, sandalwood (*Santalum album*), sandarac (*Callitris quadrivalvis*), *Sassafras officinale, Sisymbrium ino*, spearmint (*Mentha viridis*), marjoram (*Origanum marjoram*), sweet violet (*Viola odorata*), wood tar, *Thuja occidentalis*, thyme (*Thymus vulgaris*), *Vetiveria zizanoides*, wild mint (*Mentha arvensis*), *Ximenia americana*, yarrow (*Achillea millefolium*), ylang ylang (*Cananga odorata*) and mixtures thereof.

The quantity of aromatherapeutically active essential oil in the PIT emulsion according to the invention may range preferably from 0.01 to 25 wt. %, in particular from 0.1 to 10 wt. % and very particularly preferably from 0.5 to 5 wt. %, relative to the entire PIT emulsion.

According to a preferred embodiment of the invention, the PIT emulsion according to the invention also contains skin care agents or skin-conditioning active substances, in particular in quantities of >0.01 wt. %, wt. % relative to the total PIT emulsion.

Skin-conditioning active substances (skin conditioners) may in particular be such agents which impart an organoleptic advantage to the skin, for example by providing lipids and/or humectant factors. Skin conditioners may be for example proteins, amino acids, lecithins, lipoids, phosphatides, plant extracts, vitamins; fatty alcohols, fatty acids, fatty acid esters, waxes, vaseline, paraffins may also act as skin conditioners.

Skin-conditioning active substances are any such active substances which impart an organoleptic and/or cosmetic advantage to the skin. Skin-conditioning active substances are preferably selected from the following substances:
a) waxes such as for example carnauba, spermaceti, beeswax, lanolin and/or derivatives thereof and others.
b) hydrophobic plant extracts
c) hydrocarbons such as for example squalenes and/or squalanes
d) higher fatty acids, preferably those having at least 12 carbon atoms, for example lauric acid, stearic acid, behenic acid, myristic acid, palmitic acid, oleic acid, linoleic acid, linolenic acid, isostearic acid and/or polyunsaturated fatty acids and others.
e) higher fatty alcohols, preferably those having at least 12 carbon atoms, for example lauryl alcohol, cetyl alcohol, stearyl alcohol, oleyl alcohol, behenyl alcohol, cholesterol and/or 2-hexadecanol and others.
f) esters, preferably those such as cetyl octanoate, lauryl lactate, myristyl lactate, cetyl lactate, isopropyl myristate, myristyl myristate, isopropyl palmitate, isopropyl adipate, butyl stearate, decyl oleate, cholesterol isostearate, glycerol monostearate, glycerol distearate, glycerol tristearate, alkyl lactates, alkyl citrates and/or alkyl tartrates and others.
g) lipids such as for example cholesterol, ceramides and/or sucrose esters and others
h) vitamins such as for example vitamins A and E, vitamin alkyl esters, including vitamin C alkyl esters and others.
i) sunscreen preparations
j) phospholipids
k) derivatives of alpha-hydroxy acids
m) germicides for cosmetic use, both synthetic, such as for example salicylic acid and/or others, and natural, such as for example neem oil and/or others
n) silicones, in particular silicone oil
and mixtures of any of the above-stated components.

Preferably usable skin-conditioning active substances are preferably also essential oils, in particular selected from the group of garden angelica—*Angelica archangelica*, aniseed—*Pimpinella anisum*, Siam benzoin—*Styrax tokinensis*, cabreuva—*Myrocarpus fastigiatus*, cajeput—*Melaleuca leucadendron*, rock rose—*Cistrus ladaniferus*, copaiba balsam—*Copaffera reticulata*, costus root—*Saussurea discolor*, silver fir needle—*Abies alba*, elemi—*Canarium luzonicum*, fennel—*Foeniculum dulce*, pine-needle—*Picea abies*, geranium—*Pelargonium graveolens*, ho leaves—*Cinnamonum camphora*, immortelle (everlasting flower)—*Helichrysum ang.*, ginger, extra—*Zingiber off.*, St. John's wort—*Hypericum perforatum*, jojoba, German chamomile—*Matricaria recutita*, blue chamomile—*Matricaria chamomilla*, Roman chamomile—*Anthemis nobilis*, wild chamomile—*Ormensis multicaulis*, carrot—*Daucus carota*, mountain pine—*Pinus* mugho, lavandin—*Lavendula hybrida, Litsea cubeba*—(May Chang) manuka—*Leptospermum scoparium*, melissa—*Melissa officinalis*, maritime pine—*Pinus pinaster*, myrrh—*Commiphora molmol*, myrtle—*Myrtus communis*, neem—*Azadirachta*, niaouli—(MQV) *Melaleuca quin. viridiflora*, palmarosa—*Cymbopogom martini*, patchouli—*Pogostemon patschuli*, Peru balsam—*Myroxylon balsamum* var. *pereirae, Raventsara aromatica*, rosewood—*Aniba rosaeodora*, sage—*Salvia officinalis*, horsetail—*Equisetaceae*, yarrow, extra—*Achillea millefolia*, ribwort—*Plantago lanceolata*, styrax—*Liquidambar orientalis*, tagetes (marigold)—*Tagetes patula*, tea tree—*Melaleuca alternifolia*, Tolu balsam—*Myroxylon balsamum L*, Virginia cedar—*Juniperus virginiana*, frankincense (olibanum)—*Boswellia carteri*, white fir—*Abies alba*. Use of essential oils corresponds to a preferred embodiment of the invention.

Preferably usable skin-conditioning active substances are preferably also skin-protecting oils, in particular selected from the group algae oil *Phaeophyceae* oil, aloe vera oil *Aloe vera brasiliana*, apricot kernel oil *Prunus armeniaca*, arnica oil *Arnica montana*, avocado oil *Persea americana*, borage oil *Borago officinalis*, calendula oil *Calendula officinalis*, camellia oil *Camellia oleifera*, thistle oil *Carthamus tinctorius*, peanut oil *Arachis hypogaea*, hemp oil *Cannabis sativa*, hazelnut oil *Corylus avellana*, St. John's wort oil *Hypericum perforatum*, jojoba oil *Simondsia chinensis*, carrot oil *Daucus carota*, coconut oil *Cocos nucifera*, pumpkin seed oil *Curcubita pepo*, candlenut oil *Aleurites moluccana*, macadamia nut oil *Macadamia ternifolia*, almond oil *Prunus dulcis*, olive oil *Olea europaea*, peach stone oil *Prunus persica*, rapeseed oil *Brassica oleifera*, castor oil *Ricinus communis*, black cumin oil *Nigella sativa*, sesame oil *Sesamium indicum*, sunflower oil *Helianthus annus*, grapeseed oil *Vitis vinifera*, walnut oil *Juglans regia*, wheat germ oil *Triticum sativum*. Use of skin-protecting oils corresponds to a preferred embodiment of the invention.

When a PIT emulsion according to the invention is used in a dryer, the optionally present skin-conditioning active substances are transferred onto the textiles and may then in turn pass from the textile onto the skin when the textile comes into contact with the skin, for example when clothing is worn. In this way, skin-conditioning active substances in the PIT emulsions according to the invention are of benefit to the consumer's skin. In addition to the already above-stated components, the PIT emulsion according to the invention may contain still further components. Mention may in particular be made of interfacial moderators from the group of tocopherols, Guerbet alcohols with 16 to 20 C atoms and steroids with 1 to 3 OH groups.

Tocopherols are taken to mean natural materials of the vitamin E type which are derived from 2-methyl-2-(4',8',12'-trimethyltridecyl)-chroman-6-ol or "tocol". α-Tocopherol, the most commonly occurring and technically most significant tocopherol, which is often also known as the actual vitamin E, is particularly preferred.

Guerbet alcohols are taken to mean specific branched alcohols which are obtainable by the Guerbet reaction. Guerbet alcohols which are preferably usable according to the invention should comprise from 16 to 20 C atoms, such as for example 2-hexyldecanol or 2-octyldodecanol. 2-Octyldodecanol is here particularly suitable.

Steroids are taken to mean a group of naturally occurring or synthetically obtained compounds based on the skeleton of (partially) hydrogenated cyclopenta[a]phenanthrene. Steroids which are preferably usable according to the invention should comprise from 1 to 3 OH groups. Particularly suitable are those sterols in which an OH group is located on the third C atom of the steroid skeleton. Sterols occur in all animal and plant cells. Depending on their origin, they are subdivided into zoosterols, for example cholesterol, and phytosterols, which primarily occur in higher plants. Cholesterol is a particularly suitable steroid.

In the context of the present invention, preferred PIT emulsions may additionally contain one or more substances from the group of builders, bleaching agents, bleaching activators, enzymes, electrolytes, nonaqueous solvents, pH adjusting agents, fluorescent agents, dyes, hydrotropes, foam inhibitors, silicone oils, antiredeposition agents, optical brighteners, graying inhibitors, shrinkage prevention agents, anticrease agents, dye transfer inhibitors, antimicrobial active substances, germicides, fungicides, antioxidants, preservatives, corrosion inhibitors, antistatic agents, bitter agents, ironing aids, waterproofing and impregnation agents, antiswelling and anti-slip agents, neutral filler salts and UV absorbers.

The PIT emulsions according to the invention may contain antimicrobial active substances to combat microorganisms. In this connection, a distinction is drawn, depending on the antimicrobial spectrum and mechanism of action, between bacteriostatics and bactericides, fungistatics and fungicides etc. Significant substances from these groups are, for example, benzalkonium chlorides, alkylaryl sulfonates, halophenols and phenol mercuriacetate, it also being possible to omit these compounds completely from the PIT emulsions according to the invention.

The PIT emulsions according to the invention may contain preservatives, the only preservatives used preferably being those which have no or only slight skin-sensitizing potential. Examples are sorbic acid and, the salts thereof, benzoic acid and the salts thereof, salicylic acid and the salts thereof, phenoxyethanol, 3-iodo-2-propynyl butylcarbamate, sodium N-(hydroxymethyl)glycinate, biphenyl-2-ol and mixtures thereof. One suitable preservatives is a solvent-free, aqueous combination of diazolidinyl urea, sodium benzoate and potassium sorbate (obtainable as Euxyl® K 500 from Schuelke & Mayr), which may be used in a pH range of up to 7. Preservatives based on organic acids and/or the salts thereof are in particular suitable for preserving the PIT emulsion according to the invention. These compounds may also be completely omitted from the PIT emulsions according to the invention.

The PIT emulsions may contain antioxidants in order to prevent unwanted changes brought about by the action of oxygen and other oxidative processes in the PIT emulsions according to the invention or in the treated textile fabrics. This class of compounds includes, for example, substituted phenols, hydroquinones, pyrocatechols and aromatic amines as well as organic sulfides, polysulfides, dithiocarbamates, phosphites, phosphonates and vitamin E. These compounds may also be completely omitted from the PIT emulsions according to the invention.

Increased wearing comfort may result from the additional use of antistatic agents, which are additionally added to the PIT emulsions according to the invention. Antistatic agents increase surface conductivity and thus enable improved dissipation of charges which are formed. External antistatic agents are as a rule substances with at least one hydrophilic molecule ligand and produce a more or less hygroscopic film on the surfaces. These generally interfacially active antistatic agents may be subdivided into nitrogenous (amines, amides, quaternary ammonium compounds), phosphorus-containing (phosphoric acid esters) and sulfur-containing (alkyl sulfonates, alkyl sulfates) antistatic agents. Lauryl (or stearyl) dimethylbenzylammonium chlorides are suitable as antistatic agents for textile fabrics, a finishing effect additionally being achieved. These compounds may also be completely omitted from the PIT emulsions according to the invention.

Silicone derivatives or silicone oils may for example be used in the PIT emulsions according to the invention for improving rewettability of the treated textile fabrics and for facilitating ironing of the treated textile fabrics. Preferred silicone derivatives are for example polydialkyl- or alkylarylsiloxanes, in which the alkyl groups comprise one to five C atoms and are wholly or partially fluorinated. Preferred silicones are polydimethylsiloxanes, which may optionally be derivatized and are then amino-functional or quaternized or comprise Si—OH, Si—H and/or Si—Cl bonds. The viscosities of the preferred silicones at 25° C. lie in the range between 100 and 100,000 mPa·s, it being possible to use the silicones in quantities of between 0.2 and 5 wt. %, relative to the total PIT emulsion. These compounds may also be completely omitted from the PIT emulsions according to the invention.

The present invention also provides a container with a spray valve (spray can) which contains a PIT emulsion according to the invention.

The liquid in the container may be under the pressure of a propellant. Propellants which may be considered are liquefied or compressed gases, such as for example nitrogen, carbon dioxide or dinitrogen monoxide. Non-flammable gases are in particular preferred. Containers which may be considered for emulsions containing propellant are primarily cylindrical containers of metal, (protected or non-splintering) glass or plastics material.

Propellant gas-free, mechanically operated pump atomizers (pump sprays) or trigger sprays are, however, more preferred.

Accordingly, in a preferred embodiment the container comprises a pump spray container or a trigger spray container.

The present invention also provides an automatic laundry dryer which comprises an installation for atomizing the PIT emulsions according to the invention into the drying chamber during or at the beginning of the drying operation.

In such a device, the consumer can introduce the PIT emulsion according to the invention as a liquid into the automatic laundry dryer (or in into a compartment provided for this purpose) and the laundry dryer can be programmed such that it sprays the provided PIT emulsion into the drying chamber onto the laundry to be dried during or at the beginning of the drying operation.

The present invention also provides a method for laundry scenting in a textile drying method, in which the laundry to be dried is placed in an automatic (preferably electric) laundry dryer and then a PIT emulsion according to the invention is introduced into the laundry dryer by spraying or atomizing, the laundry dryer is closed and the drying program started.

This method enables very good and extremely long-lasting scenting of textiles.

In a preferred embodiment of this method, the PIT emulsion is added by means of a container as previously described.

If, in the method according to the invention, the quantity of spray per spray stroke amounts to 0.01 to 5 g, preferably 0.1 to 4 g and in particular 0.5 to 3 g, a preferred embodiment is again provided. A possible upper limit of the quantity of spray per spray stroke may also be 2 g or 1 g. The upper limit may however also be at values of >5 g, for example at 6 or 7 g. A possible lower limit for the quantity of spray per spray stroke may also be at 1 g or 2 g.

An advantage of the method according to the invention is that room scenting, which may in particular be used for aromatherapy purposes, moreover proceeds via the exhaust air of the automatic (preferably electric) laundry dryer.

The present invention accordingly also provides a method for room scenting via a textile drying method, in which the laundry to be dried is placed in an automatic (preferably electric) laundry dryer and then a PIT emulsion according to the invention is introduced into the laundry dryer by spraying or atomizing, the laundry dryer is closed and the drying program is started, the exhaust air of the automatic (preferably electric) laundry dryer serving to fragrance the room.

The use of a PIT emulsion according to the invention for scenting laundry during textile drying in an automatic (preferably electric) laundry dryer is furthermore provided by the invention.

The use of a PIT emulsion according to the invention for room scenting during textile drying in an automatic (preferably electric) laundry dryer is furthermore provided by the invention.

The present invention also provides a textile cleaning kit containing a liquid or solid textile washing agent and a container according to the invention with a spray valve as previously described containing a PIT emulsion according to the invention. In particular, it is advantageous for the PIT emulsion present in the kit to comprise aromatherapy components.

In a preferred embodiment, the kit according to the invention is distinguished in that the textile washing agent and the PIT emulsion contain substantially the same odoriferous substances. In this manner, the original "washing agent odor" (=the odor adhering to freshly washed laundry) is enhanced. This would be advantageous since the consumer sometimes wants the fragrance which adheres to freshly washed laundry to be more intense and to last still longer. The consumer could now readily achieve this by making use of the kit according to the invention. This permits the strength of the fragrance experience to be individualized.

In another preferred embodiment, the kit according to the invention is distinguished in that the textile washing agent and the PIT emulsion contain substantially different odoriferous substances. For example, the textile washing agent contains an odoriferous substance composition which triggers associations of "freshness" and "cleanness" in the consumer, whereas the PIT emulsion contains an odoriferous substance composition which triggers an association of "care" in the consumer.

Odoriferous substances which trigger associations of "freshness" or "cleanness" in the consumer were already described further above.

In a further preferred embodiment, the kit according to the invention is distinguished in that the textile washing agent and the PIT emulsion contain odoriferous substances which are perfumistically adapted to one another and which interact with one another to create a particularly pleasant fragrance.

The present invention also provides textile treatment method in which a) the textile to be treated is first subjected to washing using a washing agent, in particular in an automatic washing machine, and after which b) the washed textile is placed in an automatic (preferably electric) laundry dryer and then a PIT emulsion according to the invention is introduced into the laundry dryer by spraying or atomizing, the laundry dryer is closed and the drying program is started.

The advantage of this method is that excellent and extremely long-lasting textile scenting is made possible. Not only the durability and intensity of the resultant odor impression but also its attractiveness are superb. As a consequence of the vigorous, fiber-loosening movements in the laundry dryer, the textiles have a pleasant, soft handle. The method thus even permits textile treatment methods in which it is possible to dispense with the application of textile rinse conditioners, without having to do without their advantages. This is because, in terms of the odor impression (attractiveness/intensity/durability) achieved with textile rinse conditioners, the performance of textile rinse conditioners is even exceeded. The textile treatment method may consequently be performed not only with but also without using a rinse conditioner. Rinse conditioner is the usual name for laundry treatment agents for caring for and conditioning textiles. They contain textile-softening active ingredients such as cationic surfactants, in particular ester quats.

While particular embodiments of the present invention have been illustrated and described, it would be obvious to those skilled in the art that various other changes and modifications can be made without departing from the spirit and scope of the invention.

Other than where otherwise indicated, or where required to distinguish over the prior art, all numbers expressing quantities of ingredients herein are to be understood as modified in all instances by the term "about". As used herein, the words "may" and "may be" are to be interpreted in an open-ended, non-restrictive manner. At minimum, "may" and "may be" are to be interpreted as definitively including, but not limited to, the composition, structure, or act recited.

As used herein, and in particular as used herein to define the elements of the claims that follow, the articles "a" and "an" are synonymous and used interchangeably with "at least one" or "one or more," disclosing or encompassing both the singular and the plural, unless specifically defined herein otherwise. The conjunction "or" is used herein in both the conjunctive and disjunctive sense, such that phrases or terms conjoined by "or" disclose or encompass each phrase or term alone as well as any combination so conjoined, unless specifically defined herein otherwise.

The description of a group or class of materials as suitable or preferred for a given purpose in connection with the invention implies that mixtures of any two or more of the members of the group or class are equally suitable or preferred. Description of constituents in chemical terms refers unless otherwise indicated, to the constituents at the time of addition to any combination specified in the description, and does not necessarily preclude chemical interactions among the constituents of a mixture once mixed. Steps in any method disclosed or claimed need not be performed in the order recited, except as otherwise specifically disclosed or claimed.

Changes in form and substitution of equivalents are contemplated as circumstances may suggest or render expedient. Although specific terms have been employed herein, such terms are intended in a descriptive sense and not for purposes of limitation.

The following Example further illustrate the preferred embodiments within the scope of the present invention, but are not intended to be limiting thereof. It is understood that the example and embodiments described herein are for illustrative purposes only and that various modifications or changes in light thereof will be suggested to one skilled in the art without departing from the scope of the present invention. The appended claims therefore are intended to cover all such changes and modifications that are within the scope of this invention.

EXAMPLE

"Paradies [paradise]" PIT emulsion:

Oil Bodies:
   10 wt. % "Himmelreich [heaven]" perfume oil
   10 wt. % isopropyl myristate Nonionic Surfactant:
   4 wt. % Eumulgin B1® (C16-18 fatty alcohol, ethoxylated (12 EO))
   2 wt. % Cremophor WO7® (hydrogenated castor oil, ethoxylated (7 EO))

Co-Emulsifier:
   1.5 wt. % glyceryl monooleate

Remainder:
   Water

The "Paradies [paradise]" PIT emulsion was produced using a conventional method. The PIT range was 55-62° C.

The "Paradies [paradise]" PIT emulsion was then used during the drying of cotton laundry in a conventional commercial automatic textile dryer. The cotton laundry comprised fifteen 100% cotton fine rib knit undershirts. These were previously washed with an unperfumed washing agent in a conventional commercial washing machine. The washed cotton laundry was then placed in the textile dryer, after which 3.6 g of the "Paradies [paradise]" PIT emulsion (containing 0.36 g of the "Himmelreich [heaven]" perfume oil) were sprayed into the dryer chamber with a pump spray. The dryer was then closed and the automatic drying operation started.

By way of comparison, 15 identical fine rib knit undershirts were washed with the same unperfumed washing agent in a conventional commercial washing machine of identical construction, a conventional quantity of a conventional ester quat-containing rinse conditioner, which was also perfumed with "Himmelreich [heaven]" perfume oil, being applied in the rinse cycle. The used quantity of rinse conditioner contained the same quantity of "Himmelreich [heaven]" perfume oil as was also introduced into the dryer, namely 0.36 g. The laundry was then likewise dried in the dryer, but without adding further agents, specifically under the same conditions as in the case according to the invention.

The resultant laundry, which was thus perfumed using the same quantity of the "Himmelreich [heaven]" perfume oil, was finally assessed by a panel of 12 perfume experts.

They assessed the fragrance of the laundry (intensity and attractiveness) in each case after one day and in each case after one week. The fragrance assessment was in each case repeated twice and means were in each case calculated.

A scale from 1-6 was defined for assessing the attractiveness of the odor impression
(6: excellent 5: very pleasant; 4: pleasant; 3: acceptable; 2: inadequate, 1: unsatisfactory).

The experts determined the following averaged values:
Method according to the invention; laundry after 1 day: 5.2
Method according to the invention; laundry after 1 week: 5.5
Comparison method; laundry after 1 day: 4.7
Comparison method; laundry after 1 week: 4.5

Summary for "attractiveness": the method according to the invention gives rise to laundry with improved attractiveness in terms of the odor impression. In particular after 1 week, the odor impression was assessed to be distinctly better than in the comparison method. Surprisingly, in the method according to the invention, the odor impression did not deteriorate after 1 week, but was even classed as slightly better. In contrast, the odor impression in the comparison method declined further.

A scale from 1-5 was defined for assessing the intensity of the odor impression
(5: very high; 4: high; 3: acceptable; 2: slight, 1: very slight).

The experts determined the following averaged values:

Method according to the invention; laundry after 1 day: 4.5
Method according to the invention; laundry after 1 week: 4.4
Comparison method; laundry after 1 day: 4.2
Comparison method; laundry after 1 week: 3.5

Summary for "intensity": the method according to the invention gives rise to laundry with improved intensity of the odor impression. In particular after 1 week, the intensity of the odor impression assessed to be distinctly better than in the comparison method. Surprisingly, in the method according to the invention, the intensity of the odor impression declined only extremely slightly after 1 week. In contrast, the intensity of the odor impression in the comparison method declined distinctly.

Overall, it was possible to establish that using the "Paradies [paradise]" PIT emulsion according to the invention led to an improved fragrance experience, in terms of both the intensity and the attractiveness of the odor impression.

What is claimed:

1. A PIT emulsion, comprising a perfume and having a phase inversion temperature in the range 35-80° C.

2. The emulsion of claim 1, comprising:
   a) 0.1-25 wt.% of a nonionic surfactant;
   b) 0-10 wt.% of a coemulsifier;
   c) >1 wt.% of a perfume oil; and
   d) water.

3. The emulsion of claim 2, comprising:
   a) 1-15 wt.% of the nonionic surfactant;
   b) 0.1-5 wt.% of the coemulsifier; and
   c) 2-30 wt.% of the perfume oil.

4. The emulsion of claim 3, comprising:
   a) 2-10 wt.% of the nonionic surfactant;
   b) 1-4 wt.% of the coemulsifier; and
   c) 5-20 wt.% of the perfume oil.

5. The emulsion of claim 1, further comprising a skin-conditioning active substance.

6. The emulsion claim 1, further comprising a silicone oil.

7. The emulsion of claim 1, further comprising an aromatherapy component.

8. A spray container comprising a spray valve and containing the emulsion of claim 1.

9. A textile cleaning kit containing a liquid or solid textile washing agent and the container of claim 8.

10. The kit of claim 9, wherein the textile washing agent and the PIT emulsion in the container comprise substantially different odoriferous substances.

11. The container of claim 8, comprising a pump spray container or a trigger spray container.

12. A method for laundry scenting in a textile drying method, comprising the steps of placing laundry to be dried in an automatic laundry dryer, introducing the PIT emulsion of claim 1 into the laundry dryer by spraying or atomizing, closing the laundry dryer, and starting a drying program.

13. The method of claim 12, wherein the PIT emulsion is added by means of a spray container comprising a spray valve and containing the PIT emulsion.

14. The method of claim 12, wherein the PIT emulsion is sprayed into the dryer in one or more spray strokes, each spray stroke spraying 0.01 to 5 g of the emulsion.

15. The method of claim 14, wherein each spray stroke sprays 0.1 to 4 g of the emulsion.

16. The method of claim 15, wherein each spray stroke sprays 0.5 to 3 g of the emulsion.

\* \* \* \* \*